(12) United States Patent
Greene et al.

(10) Patent No.: US 10,313,480 B2
(45) Date of Patent: Jun. 4, 2019

(54) DATA TRANSMISSION BETWEEN NETWORKED RESOURCES

(71) Applicant: Bank of America Corporation, Charlotte, NC (US)

(72) Inventors: Tracy Beth Greene, Mooresville, NC (US); Kathleen Miranda Brand, Charlotte, NC (US); William Bradley Burks, Charlotte, NC (US); Deepak Joseph, Charlotte, NC (US); Emily Paige Bosin, Charlotte, NC (US); Frederika Zipporah Morris Angus, Charlotte, NC (US); Karla Ramirez, Charlotte, NC (US); Laura Elizabeth Randall, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 91 days.

(21) Appl. No.: 15/630,355

(22) Filed: Jun. 22, 2017

(65) Prior Publication Data
US 2018/0375960 A1 Dec. 27, 2018

(51) Int. Cl.
*G06F 17/30* (2006.01)
*H04L 12/24* (2006.01)
*H04L 29/08* (2006.01)

(52) U.S. Cl.
CPC ...... *H04L 67/327* (2013.01); *G06F 17/30902* (2013.01); *H04L 67/306* (2013.01); *H04L 41/50* (2013.01); *H04L 67/325* (2013.01)

(58) Field of Classification Search
CPC ... H04L 67/306; H04L 67/325; H04L 67/327; H04L 41/50; G06F 17/30902
See application file for complete search history.

(56) References Cited

U.S. PATENT DOCUMENTS

| 3,119,103 A | 1/1964 | Baines |
| 3,254,000 A | 5/1966 | Chibret |

(Continued)

FOREIGN PATENT DOCUMENTS

| EP | 1132876 A2 | 9/2001 |
| WO | 2012058099 A1 | 5/2012 |
| WO | 2013095486 A1 | 6/2013 |

OTHER PUBLICATIONS

Werden, Kristina. "How to Combine Visa Gift Cards." eHow.com. 1 page.http://www.ehow.com/how 6216118 combine-visa-gift-cards.html. Retrieved Jan. 8, 2013.

(Continued)

*Primary Examiner* — Davoud A Zand
(74) *Attorney, Agent, or Firm* — Michael A. Springs; Moore & Van Allen PLLC; Peter B. Stewart

(57) ABSTRACT

Embodiments of the present invention provide a system for transmitting data between networked resources. Information about a managing entity's supplemental resource is identified, where the supplemental resource supplements a set of resources associated with a user in response to a determination that a particular interaction has occurred. The supplemental resource is then determined to be associated with a third party entity's application on a computing device of the user. The third party application is adjusted by the managing entity to display a selectable notification of the supplemental resource within the third party application. Once the selectable notification is selected, the managing entity approves the supplemental resource for future use by the user. Once the particular interaction associated with the supplemental resource has occurred, the supplemental resource is applied to the set of resources at a later point in time.

20 Claims, 4 Drawing Sheets

(56) References Cited

U.S. PATENT DOCUMENTS

| | | |
|---|---|---|
| 3,256,670 A | 6/1966 | Tersigni |
| 3,307,412 A | 3/1967 | Granqvist |
| 3,330,546 A | 7/1967 | Bryan |
| 3,352,730 A | 11/1967 | Murch, Jr. |
| 3,516,056 A | 6/1970 | Matthews |
| 3,658,393 A | 4/1972 | Luthi |
| 3,718,328 A | 2/1973 | Comstock |
| 4,766,293 A | 8/1988 | Boston |
| 5,041,851 A | 8/1991 | Nelson |
| 5,176,224 A | 1/1993 | Spector |
| 5,192,854 A | 3/1993 | Counts |
| 5,201,010 A | 4/1993 | Deaton et al. |
| 5,202,826 A | 4/1993 | McCarthy |
| 5,227,874 A | 7/1993 | Von Kohorn |
| 5,239,165 A | 8/1993 | Novak |
| 5,245,533 A | 9/1993 | Marshall |
| 5,250,789 A | 10/1993 | Johnsen |
| 5,256,863 A | 10/1993 | Ferguson et al. |
| 5,265,008 A | 11/1993 | Benton et al. |
| 5,283,734 A | 2/1994 | Von Kohorn |
| 5,285,278 A | 2/1994 | Holman |
| 5,287,181 A | 2/1994 | Holman |
| 5,305,196 A | 4/1994 | Deaton et al. |
| 5,353,218 A | 10/1994 | De Lapa et al. |
| 5,368,129 A | 11/1994 | Von Kohorn |
| 5,373,440 A | 12/1994 | Cohen et al. |
| 5,388,165 A | 2/1995 | Deaton et al. |
| 5,398,326 A | 3/1995 | Lee |
| 5,398,932 A | 3/1995 | Eberhardt et al. |
| 5,417,424 A | 5/1995 | Snowden et al. |
| 5,420,606 A | 5/1995 | Begum et al. |
| 5,430,644 A | 7/1995 | Deaton et al. |
| 5,438,186 A | 8/1995 | Nair et al. |
| 5,448,471 A | 9/1995 | Deaton et al. |
| 5,470,079 A | 11/1995 | LeStrange et al. |
| 5,471,669 A | 11/1995 | Lidman |
| 5,484,998 A | 1/1996 | Beknar et al. |
| 5,491,326 A | 2/1996 | Marceau et al. |
| 5,492,370 A | 2/1996 | Chatwin et al. |
| 5,497,314 A | 3/1996 | Novak |
| 5,501,491 A | 3/1996 | Thompson |
| 5,508,731 A | 4/1996 | Von Kohorn |
| 5,517,015 A | 5/1996 | Curry et al. |
| 5,523,794 A | 6/1996 | Mankovitz et al. |
| 5,537,314 A | 7/1996 | Kanter |
| 5,539,450 A | 7/1996 | Handelman |
| 5,557,516 A | 9/1996 | Hogan |
| 5,570,465 A | 10/1996 | Tsakanikas |
| 5,588,649 A | 12/1996 | Blumberg et al. |
| 5,592,212 A | 1/1997 | Handelman |
| 5,592,376 A | 1/1997 | Hodroff |
| 5,592,560 A | 1/1997 | Deaton et al. |
| 5,603,078 A | 2/1997 | Henderson et al. |
| 5,612,527 A | 3/1997 | Ovadia |
| 5,612,868 A | 3/1997 | Off et al. |
| 5,613,012 A | 3/1997 | Hoffman et al. |
| 5,619,066 A | 4/1997 | Curry et al. |
| 5,620,079 A | 4/1997 | Molbak |
| 5,621,812 A | 4/1997 | Deaton et al. |
| 5,638,457 A | 6/1997 | Deaton et al. |
| 5,644,723 A | 7/1997 | Deaton et al. |
| 5,649,114 A | 7/1997 | Deaton et al. |
| 5,650,604 A | 7/1997 | Marcous et al. |
| 5,651,168 A | 7/1997 | Tung et al. |
| 5,659,469 A | 8/1997 | Deaton et al. |
| 5,659,740 A | 8/1997 | Ezaki et al. |
| 5,675,662 A | 10/1997 | Deaton et al. |
| 5,687,322 A | 11/1997 | Deaton et al. |
| 5,689,100 A | 11/1997 | Carrithers et al. |
| 5,703,795 A | 12/1997 | Mankovitz |
| 5,708,782 A | 1/1998 | Larson et al. |
| 5,710,886 A | 1/1998 | Christensen et al. |
| 5,715,448 A | 2/1998 | Suzuki et al. |
| 5,731,980 A | 3/1998 | Dolan et al. |
| 5,732,398 A | 3/1998 | Tagawa |
| 5,734,838 A | 3/1998 | Robinson et al. |
| 5,736,721 A | 4/1998 | Swartz |
| 5,739,512 A | 4/1998 | Tognazzini |
| 5,745,555 A | 4/1998 | Mark |
| 5,759,101 A | 6/1998 | Von Kohorn |
| 5,767,896 A | 6/1998 | Nemirofsky |
| 5,789,732 A | 8/1998 | McMahon et al. |
| 5,791,991 A | 8/1998 | Small |
| 5,799,767 A | 9/1998 | Molbak |
| 5,805,719 A | 9/1998 | Pare, Jr. et al. |
| 5,806,044 A | 9/1998 | Powell |
| 5,819,239 A | 10/1998 | Berson et al. |
| 5,821,512 A | 10/1998 | O'Hagan et al. |
| 5,822,735 A | 10/1998 | De Lapa et al. |
| 5,822,744 A | 10/1998 | Kesel |
| 5,832,457 A | 11/1998 | O'Brien et al. |
| 5,832,458 A | 11/1998 | Jones |
| 5,838,812 A | 11/1998 | Pare, Jr. et al. |
| 5,841,870 A | 11/1998 | Fieres et al. |
| 5,845,259 A | 12/1998 | West et al. |
| 5,845,265 A | 12/1998 | Woolston |
| 5,852,813 A | 12/1998 | Guenther et al. |
| 5,855,007 A | 12/1998 | Jovicic et al. |
| 5,855,369 A | 1/1999 | Lieberman |
| 5,855,514 A | 1/1999 | Kamille |
| 5,857,175 A | 1/1999 | Day et al. |
| 5,859,414 A | 1/1999 | Grimes et al. |
| 5,865,470 A | 2/1999 | Thompson |
| 5,870,723 A | 2/1999 | Pare, Jr. et al. |
| 5,873,069 A | 2/1999 | Reuhl et al. |
| 5,880,449 A | 3/1999 | Teicher et al. |
| 5,884,278 A | 3/1999 | Powell |
| 5,887,271 A | 3/1999 | Powell |
| 5,892,827 A | 4/1999 | Beach et al. |
| 5,895,902 A | 4/1999 | Ziarno |
| 5,905,246 A | 5/1999 | Fajowski |
| 5,907,350 A | 5/1999 | Nemirofsky |
| 5,916,024 A | 6/1999 | Von Kohorn |
| 5,917,168 A | 6/1999 | Nakamura et al. |
| 5,918,213 A | 6/1999 | Bernard et al. |
| 5,923,016 A | 7/1999 | Fredregill et al. |
| 5,924,080 A | 7/1999 | Johnson |
| 5,926,795 A | 7/1999 | Williams |
| 5,926,796 A | 7/1999 | Walker et al. |
| 5,931,467 A | 8/1999 | Kamille |
| 5,943,424 A | 8/1999 | Berger et al. |
| 5,948,040 A | 9/1999 | Delorme et al. |
| 5,950,173 A | 9/1999 | Perkowski |
| 5,953,047 A | 9/1999 | Nemirofsky |
| 5,953,705 A | 9/1999 | Oneda |
| 5,956,695 A | 9/1999 | Carrithers et al. |
| 5,967,844 A | 10/1999 | Doutrich et al. |
| 5,970,469 A | 10/1999 | Scroggie et al. |
| 5,970,470 A | 10/1999 | Walker et al. |
| 5,973,102 A | 10/1999 | McClosky et al. |
| 5,974,396 A | 10/1999 | Anderson et al. |
| 5,978,013 A | 11/1999 | Jones et al. |
| 5,979,757 A | 11/1999 | Tracy et al. |
| 5,988,346 A | 11/1999 | Tedesco et al. |
| 5,992,570 A | 11/1999 | Walter et al. |
| 5,992,888 A | 11/1999 | North et al. |
| 6,000,608 A | 12/1999 | Dorf |
| 6,009,411 A | 12/1999 | Kepecs |
| 6,012,038 A | 1/2000 | Powell |
| 6,012,039 A | 1/2000 | Hoffman et al. |
| 6,014,634 A | 1/2000 | Scroggie et al. |
| 6,016,255 A | 1/2000 | Bolan et al. |
| 6,021,362 A | 2/2000 | Maggard et al. |
| 6,023,688 A | 2/2000 | Ramachandran et al. |
| 6,024,288 A | 2/2000 | Gottlich et al. |
| 6,026,387 A | 2/2000 | Kesel et al. |
| 6,028,920 A | 2/2000 | Carson et al. |
| 6,032,127 A | 2/2000 | Schkolnick et al. |
| 6,035,280 A | 3/2000 | Christensen et al. |
| 6,038,549 A | 3/2000 | Davis et al. |
| 6,039,244 A | 3/2000 | Finsterwald et al. |
| 6,048,271 A | 4/2000 | Barcelou et al. |
| 6,055,513 A | 4/2000 | Katz et al. |
| 6,076,068 A | 6/2000 | Delapa et al. |

(56) References Cited

U.S. PATENT DOCUMENTS

| | | |
|---|---|---|
| 6,105,013 A | 8/2000 | Curry et al. |
| 6,110,041 A | 8/2000 | Walker et al. |
| 6,116,402 A | 9/2000 | Beach et al. |
| 6,116,505 A | 9/2000 | Withrow et al. |
| 6,119,103 A | 9/2000 | Basch et al. |
| 6,125,349 A | 9/2000 | Maher et al. |
| 6,129,346 A | 10/2000 | Zorn |
| 6,138,105 A | 10/2000 | Walker et al. |
| 6,138,911 A | 10/2000 | Fredregill et al. |
| 6,161,059 A | 12/2000 | Tedesco et al. |
| 6,185,545 B1 | 2/2001 | Resnick et al. |
| 6,189,787 B1 | 2/2001 | Dorf |
| 6,199,753 B1 | 3/2001 | Tracy et al. |
| 6,230,143 B1 | 5/2001 | Simons et al. |
| 6,233,564 B1 | 5/2001 | Schulze, Jr. |
| 6,237,145 B1 | 5/2001 | Narasimhan et al. |
| 6,251,017 B1 | 6/2001 | Leason et al. |
| 6,254,000 B1 | 7/2001 | Degen et al. |
| 6,256,670 B1 | 7/2001 | Davies |
| 6,266,647 B1 | 7/2001 | Fernandez |
| 6,276,724 B1 | 8/2001 | Zorn |
| 6,292,785 B1 | 9/2001 | McEvoy et al. |
| 6,292,786 B1 | 9/2001 | Deaton et al. |
| 6,306,035 B1 | 10/2001 | Kelly et al. |
| 6,308,893 B1 | 10/2001 | Waxelbaum et al. |
| 6,311,896 B1 | 11/2001 | Mulla et al. |
| 6,314,519 B1 | 11/2001 | Davis et al. |
| 6,321,208 B1 | 11/2001 | Barnett et al. |
| 6,327,594 B1 | 12/2001 | Van Huben et al. |
| 6,330,543 B1 | 12/2001 | Kepecs |
| 6,330,546 B1 | 12/2001 | Gopinathan et al. |
| 6,332,128 B1 | 12/2001 | Nicholson |
| 6,334,108 B1 | 12/2001 | Deaton et al. |
| 6,336,099 B1 | 1/2002 | Barnett et al. |
| 6,351,735 B1 | 2/2002 | Deaton et al. |
| 6,356,877 B1 | 3/2002 | Schulden et al. |
| 6,363,351 B1 | 3/2002 | Moro |
| 6,366,682 B1 | 4/2002 | Hoffman et al. |
| 6,377,935 B1 | 4/2002 | Deaton et al. |
| 6,386,323 B1 | 5/2002 | Ramachandran et al. |
| 6,394,341 B1 | 5/2002 | Mäkipää et al. |
| 6,394,907 B1 | 5/2002 | Rowe |
| 6,397,198 B1 | 5/2002 | Hoffman et al. |
| 6,402,030 B1 | 6/2002 | Summers et al. |
| 6,408,286 B1 | 6/2002 | Heiden |
| 6,422,462 B1 | 7/2002 | Cohen |
| 6,424,949 B1 | 7/2002 | Deaton et al. |
| 6,456,980 B1 | 9/2002 | Powell |
| 6,466,921 B1 | 10/2002 | Cordery et al. |
| 6,467,684 B2 | 10/2002 | Fite et al. |
| 6,467,686 B1 | 10/2002 | Guthrie et al. |
| 6,487,540 B1 | 11/2002 | Smith et al. |
| 6,493,110 B1 | 12/2002 | Roberts |
| 6,493,724 B1 | 12/2002 | Cusack et al. |
| 6,496,804 B2 | 12/2002 | McEvoy et al. |
| 6,497,360 B1 | 12/2002 | Schulze, Jr. |
| 6,508,398 B1 | 1/2003 | Estes |
| 6,516,056 B1 | 2/2003 | Justice et al. |
| 6,651,168 B1 | 11/2003 | Kao et al. |
| 6,658,393 B1 | 12/2003 | Basch et al. |
| 6,718,328 B1 | 4/2004 | Norris |
| 6,722,473 B1 | 4/2004 | Ramachandran et al. |
| 6,748,365 B1 | 6/2004 | Quinlan et al. |
| 6,748,367 B1 | 6/2004 | Lee |
| 6,749,240 B1 | 6/2004 | Burr et al. |
| 6,758,393 B1 | 7/2004 | Luciano et al. |
| 6,766,301 B1 | 7/2004 | Daniel et al. |
| 6,769,010 B1 | 7/2004 | Knapp et al. |
| 6,778,967 B1 | 8/2004 | Nicholson |
| 6,779,772 B2 | 8/2004 | De Leon |
| 6,795,707 B2 | 9/2004 | Martin et al. |
| 6,810,385 B1 | 10/2004 | Brady et al. |
| 6,829,596 B1 | 12/2004 | Frazee |
| 6,837,436 B2 | 1/2005 | Swartz et al. |
| 6,850,901 B1 | 2/2005 | Hunter et al. |
| 6,852,031 B1 | 2/2005 | Rowe |
| 6,862,575 B1 | 3/2005 | Anttila et al. |
| 6,865,546 B1 | 3/2005 | Song |
| 6,868,406 B1 | 3/2005 | Ogg et al. |
| 6,876,978 B1 | 4/2005 | Walker et al. |
| 6,882,442 B2 | 4/2005 | Roberts |
| 6,885,994 B1 | 4/2005 | Scroggie et al. |
| 6,886,748 B1 | 5/2005 | Moore |
| 6,892,180 B1 | 5/2005 | Pointeau et al. |
| 6,898,598 B2 | 5/2005 | Himmel et al. |
| 6,901,374 B1 | 5/2005 | Himes |
| 6,901,436 B1 | 5/2005 | Schneider |
| 6,915,271 B1 | 7/2005 | Meyer et al. |
| 6,925,441 B1 | 8/2005 | Jones, III et al. |
| 6,932,270 B1 | 8/2005 | Fajkowski |
| 6,937,995 B1 | 8/2005 | Kepecs |
| 6,954,732 B1 | 10/2005 | DeLapa et al. |
| 6,957,186 B1 | 10/2005 | Guheen et al. |
| 6,959,286 B2 | 10/2005 | Perkowski |
| 6,961,712 B1 | 11/2005 | Perkowski |
| 6,961,713 B2 | 11/2005 | Perkowski |
| 6,965,872 B1 | 11/2005 | Grdina |
| 6,969,318 B1 | 11/2005 | Packes, Jr. et al. |
| 6,970,852 B1 | 11/2005 | Sendo et al. |
| 6,975,937 B1 | 12/2005 | Kantarjiev et al. |
| 6,978,380 B1 | 12/2005 | Husain et al. |
| 6,980,670 B1 | 12/2005 | Hoffman et al. |
| 6,985,452 B2 | 1/2006 | Marshall et al. |
| 6,985,608 B2 | 1/2006 | Hoffman et al. |
| 6,993,498 B1 | 1/2006 | Deaton et al. |
| 6,999,943 B1 | 2/2006 | Johnson et al. |
| 7,003,495 B1 | 2/2006 | Burger et al. |
| 7,003,500 B1 | 2/2006 | Driessen |
| 7,006,983 B1 | 2/2006 | Packes, Jr. et al. |
| 7,010,498 B1 | 3/2006 | Berstis |
| 7,013,286 B1 | 3/2006 | Aggarwal et al. |
| 7,013,290 B2 | 3/2006 | Ananian |
| 7,016,532 B2 | 3/2006 | Boncyk et al. |
| 7,016,860 B2 | 3/2006 | Modani et al. |
| 7,016,862 B1 | 3/2006 | Vassigh et al. |
| 7,024,374 B1 | 4/2006 | Day et al. |
| 7,031,945 B1 | 4/2006 | Donner |
| 7,043,441 B1 | 5/2006 | Maher |
| 7,047,205 B2 | 5/2006 | Hale et al. |
| 7,052,393 B1 | 5/2006 | Schoen |
| 7,054,830 B1 | 5/2006 | Eggleston et al. |
| 7,054,837 B2 | 5/2006 | Hoffman et al. |
| 7,058,596 B1 | 6/2006 | Wojcik et al. |
| 7,058,806 B2 | 6/2006 | Smeets et al. |
| 7,063,263 B2 | 6/2006 | Swartz et al. |
| 7,065,559 B1 | 6/2006 | Weiss |
| 7,068,382 B1 | 6/2006 | Silverbrook et al. |
| 7,072,862 B1 | 7/2006 | Wilson |
| 7,085,818 B2 | 8/2006 | Brown et al. |
| 7,089,199 B2 | 8/2006 | Perkowski |
| 7,089,322 B1 | 8/2006 | Stallmann |
| 7,107,221 B1 | 9/2006 | Tracy et al. |
| 7,107,231 B1 | 9/2006 | Hall et al. |
| 7,111,323 B1 | 9/2006 | Bhatia et al. |
| 7,117,183 B2 | 10/2006 | Blair et al. |
| 7,120,596 B2 | 10/2006 | Hoffman et al. |
| 7,120,607 B2 | 10/2006 | Bolle et al. |
| 7,124,101 B1 | 10/2006 | Mikurak |
| 7,127,236 B2 | 10/2006 | Khan et al. |
| 7,127,414 B1 | 10/2006 | Awadallah et al. |
| 7,130,807 B1 | 10/2006 | Mikurak |
| 7,136,835 B1 | 11/2006 | Flitcroft et al. |
| 7,143,055 B1 | 11/2006 | Perkowski |
| 7,150,028 B1 | 12/2006 | Ranta |
| 7,152,040 B1 | 12/2006 | Hawthorne et al. |
| 7,155,228 B2 | 12/2006 | Rappaport et al. |
| 7,158,948 B1 | 1/2007 | Rodriguez et al. |
| 7,162,454 B1 | 1/2007 | Donner et al. |
| 7,165,041 B1 | 1/2007 | Guheen et al. |
| 7,168,617 B2 | 1/2007 | Walker et al. |
| 7,177,838 B1 | 2/2007 | Ling |
| 7,178,720 B1 | 2/2007 | Strubbe et al. |
| 7,185,809 B2 | 3/2007 | Barton et al. |
| 7,188,138 B1 | 3/2007 | Schneider |

(56) References Cited

U.S. PATENT DOCUMENTS

| | | |
|---|---|---|
| 7,203,665 B2 | 4/2007 | Donner |
| 7,213,754 B2 | 5/2007 | Eglen et al. |
| 7,216,109 B1 | 5/2007 | Donner |
| 7,216,110 B1 | 5/2007 | Ogg et al. |
| 7,231,357 B1 | 6/2007 | Shanman et al. |
| 7,233,913 B2 | 6/2007 | Scroggie et al. |
| 7,236,956 B1 | 6/2007 | Ogg et al. |
| 7,240,023 B1 | 7/2007 | Powell |
| 7,240,037 B1 | 7/2007 | Bussell |
| 7,246,158 B2 | 7/2007 | Kitada et al. |
| 7,248,719 B2 | 7/2007 | Hoffman et al. |
| 7,249,096 B1 | 7/2007 | Lasater et al. |
| 7,257,545 B1 | 8/2007 | Hung |
| 7,263,507 B1 | 8/2007 | Brake, Jr. et al. |
| 7,267,614 B1 | 9/2007 | Jorasch et al. |
| 7,277,866 B1 | 10/2007 | Or-Bach et al. |
| 7,280,975 B1 | 10/2007 | Donner |
| 7,280,979 B1 | 10/2007 | Katz et al. |
| 7,283,650 B1 | 10/2007 | Sharma et al. |
| 7,283,974 B2 | 10/2007 | Katz et al. |
| 7,292,999 B2 | 11/2007 | Hobson et al. |
| 7,296,282 B1 | 11/2007 | Koplar et al. |
| 7,306,141 B1 | 12/2007 | Schwarz, Jr. |
| 7,308,254 B1 | 12/2007 | Rissanen |
| 7,311,244 B1 | 12/2007 | Schwarz, Jr. |
| 7,315,826 B1 | 1/2008 | Guheen et al. |
| 7,318,041 B2 | 1/2008 | Walker et al. |
| 7,319,987 B1 | 1/2008 | Hoffman et al. |
| 7,328,189 B2 | 2/2008 | Ling |
| 7,330,974 B1 | 2/2008 | Silverbrook et al. |
| 7,334,728 B2 | 2/2008 | Williams |
| 7,337,144 B1 | 2/2008 | Blinn et al. |
| 7,340,439 B2 | 3/2008 | Burger et al. |
| 7,343,350 B1 | 3/2008 | Donner |
| 7,349,668 B2 | 3/2008 | Ilan et al. |
| 7,357,311 B2 | 4/2008 | Silverbrook et al. |
| 7,357,312 B2 | 4/2008 | Gangi |
| 7,364,068 B1 | 4/2008 | Strubbe et al. |
| 7,364,086 B2 | 4/2008 | Mesaros |
| 7,367,500 B2 | 5/2008 | Fajkowski |
| 7,376,580 B1 | 5/2008 | Walker et al. |
| 7,376,591 B2 | 5/2008 | Owens |
| 7,377,421 B2 | 5/2008 | Rhoads |
| 7,379,891 B1 | 5/2008 | Donner et al. |
| 7,380,709 B2 | 6/2008 | Silverbrook et al. |
| 7,386,485 B1 | 6/2008 | Mussman et al. |
| 7,386,517 B1 | 6/2008 | Donner |
| 7,396,281 B2 | 7/2008 | Mendelsohn et al. |
| 7,398,225 B2 | 7/2008 | Voltmer et al. |
| 7,398,250 B2 | 7/2008 | Blinn et al. |
| 7,400,932 B2 | 7/2008 | Ackley et al. |
| 7,403,652 B2 | 7/2008 | Boncyk et al. |
| 7,403,796 B2 | 7/2008 | Silverbrook et al. |
| 7,406,436 B1 | 7/2008 | Reisman |
| 7,407,092 B2 | 8/2008 | Silverbrook et al. |
| 7,412,081 B2 | 8/2008 | Doi |
| 7,412,409 B2 | 8/2008 | Aliabadi et al. |
| 7,415,424 B1 | 8/2008 | Donner |
| 7,415,443 B2 | 8/2008 | Hobson et al. |
| 7,424,303 B2 | 9/2008 | Al-Sarawi |
| 7,428,498 B2 | 9/2008 | Voltmer et al. |
| 7,428,986 B2 | 9/2008 | Silverbrook et al. |
| 7,438,215 B2 | 10/2008 | Silverbrook et al. |
| 7,441,697 B2 | 10/2008 | Fletcher |
| 7,441,710 B2 | 10/2008 | Perkowski |
| 7,441,712 B2 | 10/2008 | Silverbrook et al. |
| 7,448,538 B2 | 11/2008 | Fletcher |
| 7,455,586 B2 | 11/2008 | Nguyen et al. |
| 7,464,050 B1 | 12/2008 | Deaton et al. |
| 7,469,829 B2 | 12/2008 | Silverbrook et al. |
| 7,472,827 B2 | 1/2009 | Fletcher |
| 7,477,780 B2 | 1/2009 | Boncyk et al. |
| 7,487,912 B2 | 2/2009 | Seifert et al. |
| 7,490,065 B1 | 2/2009 | Ogg et al. |
| 7,496,524 B2 | 2/2009 | Voltmer et al. |
| 7,496,527 B2 | 2/2009 | Silverstein et al. |
| 7,506,168 B2 | 3/2009 | Silverbrook et al. |
| 7,515,914 B2 | 4/2009 | Herrod et al. |
| 7,516,886 B2 | 4/2009 | Gangi |
| 7,526,280 B2 | 4/2009 | Jung et al. |
| 7,529,688 B2 | 5/2009 | Prakash |
| 7,529,713 B1 | 5/2009 | Donner |
| 7,533,810 B2 | 5/2009 | Walker et al. |
| 7,534,169 B2 | 5/2009 | Amaitis et al. |
| 7,536,034 B2 | 5/2009 | Rhoads et al. |
| 7,537,153 B2 | 5/2009 | Hurwitz et al. |
| 7,540,408 B2 | 6/2009 | Levine et al. |
| 7,546,257 B2 | 6/2009 | Hoffman et al. |
| 7,548,889 B2 | 6/2009 | Bhambri et al. |
| 7,562,028 B1 | 7/2009 | Donner |
| 7,562,051 B1 | 7/2009 | Donner |
| 7,564,469 B2 | 7/2009 | Cohen |
| 7,565,008 B2 | 7/2009 | Boncyk et al. |
| 7,565,328 B1 | 7/2009 | Donner |
| 7,567,940 B1 | 7/2009 | Engelberg et al. |
| 7,575,172 B2 | 8/2009 | Silverbrook et al. |
| 7,577,575 B1 | 8/2009 | Donner et al. |
| 7,577,619 B1 | 8/2009 | Donner et al. |
| 7,577,620 B1 | 8/2009 | Donner |
| 7,580,856 B1 | 8/2009 | Pliha |
| 7,584,133 B2 | 9/2009 | Horowitz |
| 7,584,134 B2 | 9/2009 | Horowitz |
| 7,584,139 B2 | 9/2009 | Goodwin et al. |
| 7,590,589 B2 | 9/2009 | Hoffberg |
| 7,591,724 B2 | 9/2009 | Baerlocher |
| 7,593,871 B1 | 9/2009 | Mesaros |
| 7,593,883 B2 | 9/2009 | Horowitz |
| 7,596,530 B1 | 9/2009 | Glasberg |
| 7,597,250 B2 | 10/2009 | Finn |
| 7,599,857 B2 | 10/2009 | Bishop et al. |
| 7,606,560 B2 | 10/2009 | Labrou et al. |
| 7,606,730 B2 | 10/2009 | Antonucci |
| 7,606,741 B2 | 10/2009 | King et al. |
| 7,610,040 B2 | 10/2009 | Cantini et al. |
| 7,613,628 B2 | 11/2009 | Ariff et al. |
| 7,617,159 B1 | 11/2009 | Donner |
| 7,620,475 B1 | 11/2009 | Bottazzi et al. |
| 7,621,442 B2 | 11/2009 | Silverbrook et al. |
| 7,627,499 B2 | 12/2009 | Hahn-Carlson |
| 7,627,505 B2 | 12/2009 | Yoshida et al. |
| 7,637,810 B2 | 12/2009 | Amaitis et al. |
| 7,646,503 B2 | 1/2010 | Silverbrook et al. |
| 7,657,489 B2 | 2/2010 | Stambaugh |
| 7,658,327 B2 | 2/2010 | Tuchman et al. |
| 7,658,674 B2 | 2/2010 | Walker et al. |
| 7,660,581 B2 | 2/2010 | Ramer et al. |
| 7,663,789 B2 | 2/2010 | Silverbrook et al. |
| 7,673,315 B1 | 3/2010 | Wong et al. |
| 7,677,445 B2 | 3/2010 | Silverbrook et al. |
| 7,680,324 B2 | 3/2010 | Boncyk et al. |
| 7,681,800 B2 | 3/2010 | Silverbrook et al. |
| 7,685,083 B2 | 3/2010 | Fairweather |
| 7,689,302 B2 | 3/2010 | Schlottmann et al. |
| 7,689,473 B2 | 3/2010 | Borom et al. |
| 7,693,766 B2 | 4/2010 | Horowitz |
| 7,693,771 B1 | 4/2010 | Zimmerman et al. |
| 7,698,221 B2 | 4/2010 | Blinn et al. |
| 7,698,443 B2 | 4/2010 | Yaffe et al. |
| 7,702,318 B2 | 4/2010 | Ramer et al. |
| 7,702,918 B2 | 4/2010 | Tattan et al. |
| 7,706,838 B2 | 4/2010 | Atsmon et al. |
| 7,711,598 B2 | 5/2010 | Perkowski |
| 7,716,077 B1 | 5/2010 | Mikurak |
| 7,716,080 B2 | 5/2010 | Postrel |
| 7,720,718 B2 | 5/2010 | Hale et al. |
| 7,729,925 B2 | 6/2010 | Maritzen et al. |
| 7,729,945 B1 | 6/2010 | Katz et al. |
| 7,735,726 B2 | 6/2010 | Bjoraker et al. |
| 7,739,162 B1 | 6/2010 | Pettey et al. |
| 7,739,169 B2 | 6/2010 | Hammad |
| 7,742,755 B2 | 6/2010 | Silverbrook et al. |
| 7,742,967 B1 | 6/2010 | Keresman, III et al. |
| 7,742,989 B2 | 6/2010 | Schultz |
| 7,747,280 B2 | 6/2010 | Silverbrook et al. |

(56) References Cited

U.S. PATENT DOCUMENTS

| | | |
|---|---|---|
| 7,752,141 B1 | 7/2010 | Ogg et al. |
| 7,753,259 B1 | 7/2010 | Taylor et al. |
| 7,753,264 B2 | 7/2010 | Shafer et al. |
| 7,761,338 B1 | 7/2010 | Schneider et al. |
| 7,762,470 B2 | 7/2010 | Finn et al. |
| 7,762,885 B2 | 7/2010 | Kelly et al. |
| 7,765,124 B2 | 7/2010 | Postrel |
| 7,771,271 B2 | 8/2010 | Walker et al. |
| 7,774,231 B2 | 8/2010 | Pond et al. |
| 7,774,274 B2 | 8/2010 | Jones et al. |
| 7,775,437 B2 | 8/2010 | Cohen |
| 7,778,769 B2 | 8/2010 | Boss et al. |
| 7,778,920 B2 | 8/2010 | Zarin et al. |
| 7,780,526 B2 | 8/2010 | Nguyen et al. |
| 7,783,281 B1 | 8/2010 | Cook et al. |
| 7,783,515 B1 | 8/2010 | Kumar et al. |
| 7,783,532 B2 | 8/2010 | Hsu et al. |
| 7,783,542 B2 | 8/2010 | Horowitz |
| 7,783,543 B2 | 8/2010 | Horowitz |
| 7,783,544 B2 | 8/2010 | Horowitz |
| 7,783,566 B2 | 8/2010 | Armes et al. |
| 7,784,681 B2 | 8/2010 | Silverbrook et al. |
| 7,784,682 B2 | 8/2010 | Taylor et al. |
| 7,784,684 B2 | 8/2010 | Labrou et al. |
| 7,788,129 B2 | 8/2010 | Antonucci et al. |
| 7,788,188 B2 | 8/2010 | Kramer |
| 7,792,298 B2 | 9/2010 | Silverbrook et al. |
| 7,792,518 B2 | 9/2010 | Trioano et al. |
| 7,792,539 B2 | 9/2010 | Inselberg |
| 7,792,702 B1 | 9/2010 | Katz et al. |
| 7,792,738 B2 | 9/2010 | Channell |
| 7,796,162 B2 | 9/2010 | Ortiz |
| 7,796,640 B2 | 9/2010 | Giroux et al. |
| 7,797,005 B2 | 9/2010 | Inselberg |
| 7,797,021 B2 | 9/2010 | Silverbrook et al. |
| 7,797,192 B2 | 9/2010 | Mitchell et al. |
| 7,798,397 B2 | 9/2010 | Henry et al. |
| 7,801,629 B2 | 9/2010 | Hale et al. |
| 7,812,935 B2 | 10/2010 | Cowburn et al. |
| 7,813,955 B2 | 10/2010 | Ariff et al. |
| 7,815,114 B2 | 10/2010 | Mesaros |
| 7,818,215 B2 | 10/2010 | King et al. |
| 7,818,392 B1 | 10/2010 | Martino et al. |
| 7,818,415 B2 | 10/2010 | Jhanji |
| 7,822,635 B1 | 10/2010 | Brown et al. |
| 7,822,647 B1 | 10/2010 | Mussman et al. |
| 7,828,208 B2 | 11/2010 | Gangi |
| 7,833,101 B2 | 11/2010 | Lutnick et al. |
| 7,835,960 B2 | 11/2010 | Breck et al. |
| 7,840,485 B1 | 11/2010 | Warren et al. |
| 7,843,595 B2 | 11/2010 | Silverbrook et al. |
| 7,843,596 B2 | 11/2010 | Silverbrook et al. |
| 7,844,492 B2 | 11/2010 | Perkowski et al. |
| 7,845,555 B2 | 12/2010 | Walker et al. |
| 7,848,980 B2 | 12/2010 | Carlson |
| 7,853,241 B1 | 12/2010 | Harrison |
| 7,854,386 B2 | 12/2010 | Silverbrook et al. |
| 7,855,805 B2 | 12/2010 | Silverbrook et al. |
| 7,856,360 B2 | 12/2010 | Kramer et al. |
| 7,856,368 B2 | 12/2010 | Avallone et al. |
| 7,856,377 B2 | 12/2010 | Cohagan et al. |
| 7,856,414 B2 | 12/2010 | Zee |
| 7,860,871 B2 | 12/2010 | Ramer et al. |
| 7,865,187 B2 | 1/2011 | Ramer et al. |
| 7,865,447 B2 | 1/2011 | Rosenhaft et al. |
| 7,870,022 B2 | 1/2011 | Bous et al. |
| 7,873,547 B2 | 1/2011 | Borom et al. |
| 7,873,579 B2 | 1/2011 | Hobson et al. |
| 7,873,580 B2 | 1/2011 | Hobson et al. |
| 7,881,529 B2 | 2/2011 | Boncyk et al. |
| 7,881,965 B2 | 2/2011 | Bowles et al. |
| 7,882,032 B1 | 2/2011 | Hoffman |
| 7,890,367 B2 | 2/2011 | Senghore et al. |
| 7,895,120 B2 | 2/2011 | Walker et al. |
| 7,899,243 B2 | 3/2011 | Boncyk et al. |
| 7,899,252 B2 | 3/2011 | Boncyk et al. |
| 7,899,710 B1 | 3/2011 | Walker et al. |
| 7,903,029 B2 | 3/2011 | Dupray |
| 7,907,940 B2 | 3/2011 | Ramer et al. |
| 7,908,237 B2 | 3/2011 | Angell et al. |
| 7,970,648 B2 | 6/2011 | Gailey et al. |
| 7,970,669 B1 | 6/2011 | Santos |
| 7,992,779 B2 | 8/2011 | Phillips et al. |
| 8,012,219 B2 | 9/2011 | Mendez et al. |
| 8,015,076 B2 | 9/2011 | Owens |
| 8,032,932 B2 | 10/2011 | Speyer et al. |
| 8,065,201 B2 | 11/2011 | Perkowski |
| 8,073,460 B1 | 12/2011 | Scofield et al. |
| 8,099,360 B2 | 1/2012 | Walker et al. |
| 8,138,930 B1 | 3/2012 | Heath |
| 8,160,929 B1 | 4/2012 | Park et al. |
| 8,167,199 B1 | 5/2012 | Voutour |
| 8,171,531 B2 | 5/2012 | Buer |
| 8,180,706 B2 | 5/2012 | Bishop et al. |
| 8,209,229 B1 | 6/2012 | Weiss et al. |
| 8,249,805 B2 | 8/2012 | de Silva et al. |
| 8,260,663 B1 | 9/2012 | Ranka et al. |
| 8,261,093 B1 | 9/2012 | Dhesi et al. |
| 8,271,344 B1 | 9/2012 | Channakeshava et al. |
| 8,307,413 B2 | 11/2012 | Smadja et al. |
| 8,311,893 B2 | 11/2012 | Schoettle |
| 8,327,428 B2 | 12/2012 | Bailey et al. |
| 8,327,429 B2 | 12/2012 | Speyer et al. |
| 8,340,981 B1 | 12/2012 | Cave |
| 8,346,666 B2 | 1/2013 | Lindelsee et al. |
| 8,352,323 B2 | 1/2013 | Fisher |
| 8,380,177 B2 | 2/2013 | Laracey |
| 8,386,309 B2 | 2/2013 | Thibedeau et al. |
| 8,395,242 B2 | 3/2013 | Oliver et al. |
| 8,407,142 B1 | 3/2013 | Griggs |
| 8,423,466 B2 | 4/2013 | Lanc |
| 8,426,884 B2 | 4/2013 | Mizutani et al. |
| 8,452,705 B2 | 5/2013 | Boal |
| 8,489,456 B2 | 7/2013 | Burgess et al. |
| 8,494,915 B2 | 7/2013 | Mesaros |
| 8,498,940 B2 | 7/2013 | Pelegero et al. |
| 8,522,039 B2 | 8/2013 | Hyndman et al. |
| 8,560,389 B2 | 10/2013 | Burgess et al. |
| 8,571,983 B1 | 10/2013 | Blackhurst et al. |
| 8,572,689 B2 | 10/2013 | Radhakrishnan |
| 8,577,804 B1 | 11/2013 | Bacastow |
| 8,583,498 B2 | 11/2013 | Fried et al. |
| 8,584,251 B2 | 11/2013 | McGuire et al. |
| 8,589,271 B2 | 11/2013 | Evans |
| 8,590,008 B1 | 11/2013 | Ellmore |
| 8,590,785 B1 | 11/2013 | Mesaros |
| 8,595,812 B2 | 11/2013 | Bomar et al. |
| 8,606,629 B2 | 12/2013 | Bous et al. |
| 8,620,790 B2 | 12/2013 | Priebatsch |
| 8,637,133 B2 | 1/2014 | Vagliardo |
| 8,650,072 B2 | 2/2014 | Mason et al. |
| 8,650,757 B2 | 2/2014 | Rode |
| 8,660,951 B2 | 2/2014 | Calman et al. |
| 8,660,965 B1 | 2/2014 | Bickerstaff |
| 8,665,991 B2 | 3/2014 | Zhu et al. |
| 8,666,660 B2 | 3/2014 | Sartipi et al. |
| 8,682,802 B1 | 3/2014 | Kannanari |
| 8,683,571 B2 | 3/2014 | Zapata et al. |
| 8,700,472 B2 | 4/2014 | Gray |
| 8,732,814 B2 | 5/2014 | Radhakrishnan et al. |
| 8,733,637 B1 | 5/2014 | Cedeno |
| 8,751,298 B1 | 6/2014 | Giordano et al. |
| 8,768,838 B1 | 7/2014 | Hoffman |
| 8,775,243 B2 | 7/2014 | Gillenson et al. |
| 8,781,894 B2 | 7/2014 | Walker et al. |
| 8,788,333 B2 | 7/2014 | Alba et al. |
| 8,788,429 B2 | 7/2014 | Tieken |
| 8,789,162 B2 | 7/2014 | Radhakrishnan |
| 8,799,060 B2 | 8/2014 | Gillenson et al. |
| 8,799,087 B2 | 8/2014 | Martin et al. |
| 8,825,523 B2 | 9/2014 | Gillenson et al. |
| 8,839,383 B2 | 9/2014 | Van Horn |
| 8,850,575 B1 | 9/2014 | Magi Shaashua et al. |
| 8,909,771 B2 | 12/2014 | Heath |

(56) References Cited

U.S. PATENT DOCUMENTS

| | | |
|---|---|---|
| 8,930,271 B1 | 1/2015 | Ellis et al. |
| 8,943,574 B2 | 1/2015 | Bailey et al. |
| 8,966,423 B2 | 2/2015 | Jain et al. |
| 8,973,102 B2 | 3/2015 | Jakobsson |
| 8,973,819 B2 | 3/2015 | Blackhurst et al. |
| 8,985,442 B1 | 3/2015 | Zhou et al. |
| 8,996,423 B2 | 3/2015 | Johnson et al. |
| 8,997,215 B2 | 3/2015 | Guriappa Srinivas et al. |
| 9,002,924 B2 | 4/2015 | Saretto et al. |
| 9,053,514 B2 | 6/2015 | Bennett et al. |
| 9,055,053 B2 | 6/2015 | Radhakrishnan et al. |
| 9,069,943 B2 | 6/2015 | Radhakrishnan et al. |
| 9,082,153 B2 | 7/2015 | Bennett et al. |
| 9,098,879 B2 | 8/2015 | Bennett et al. |
| 9,100,795 B2 | 8/2015 | Sartipi et al. |
| 9,105,059 B2 | 8/2015 | Gluzberg et al. |
| 9,131,443 B2 | 9/2015 | Takaki |
| 9,146,345 B1 | 9/2015 | Dong et al. |
| 9,152,963 B2 | 10/2015 | Blackhurst et al. |
| 9,196,188 B2 | 11/2015 | Kimura |
| 9,200,154 B2 | 12/2015 | Teramoto et al. |
| 9,238,674 B2 | 1/2016 | Manoj et al. |
| 9,275,278 B2 | 3/2016 | Liu et al. |
| 9,324,091 B2 | 4/2016 | Randell et al. |
| 9,355,392 B2 | 5/2016 | Blackhurst et al. |
| 9,379,586 B2 | 6/2016 | Rahman et al. |
| 9,400,005 B2 | 7/2016 | Osborn et al. |
| 9,419,841 B1 | 8/2016 | Kozolchyk et al. |
| 9,514,486 B2 | 12/2016 | Raman |
| 9,519,895 B2 | 12/2016 | Blackhurst et al. |
| 9,519,929 B2 | 12/2016 | Hellal et al. |
| 9,552,603 B1 | 1/2017 | Chanda et al. |
| 9,554,274 B1 | 1/2017 | Castinado et al. |
| 9,576,279 B2 | 2/2017 | Pollin et al. |
| 9,576,294 B2 | 2/2017 | Gebb et al. |
| 9,589,256 B1 | 3/2017 | Thomas et al. |
| 9,600,839 B2 | 3/2017 | Calman et al. |
| 9,633,342 B2 | 4/2017 | Blackhurst et al. |
| 9,639,836 B2 | 5/2017 | Bondesen et al. |
| 9,639,837 B2 | 5/2017 | Laracey |
| 9,639,852 B2 | 5/2017 | Low et al. |
| 10,013,153 B1 | 7/2018 | Freeman et al. |
| 2002/0062249 A1 | 5/2002 | Iannacci |
| 2002/0065720 A1 | 5/2002 | Carswell et al. |
| 2002/0095333 A1 | 7/2002 | Jokinen et al. |
| 2002/0111907 A1 | 8/2002 | Ling |
| 2002/0116214 A1 | 8/2002 | Horn |
| 2002/0116249 A1 | 8/2002 | Ellinger et al. |
| 2002/0152123 A1 | 10/2002 | Giordano et al. |
| 2002/0157029 A1 | 10/2002 | French et al. |
| 2002/0174073 A1 | 11/2002 | Nordman et al. |
| 2002/0186845 A1 | 12/2002 | Dutta et al. |
| 2002/0188561 A1 | 12/2002 | Schultz |
| 2003/0004866 A1 | 1/2003 | Huennekens et al. |
| 2003/0018550 A1 | 1/2003 | Rotman et al. |
| 2003/0045328 A1 | 3/2003 | Natsuno |
| 2003/0055727 A1 | 3/2003 | Walker et al. |
| 2003/0061170 A1 | 3/2003 | Uzo |
| 2003/0064705 A1 | 4/2003 | Desiderio |
| 2003/0065805 A1 | 4/2003 | Barnes, Jr. |
| 2003/0074311 A1 | 4/2003 | Saylors et al. |
| 2003/0088462 A1 | 5/2003 | Carrithers et al. |
| 2003/0105714 A1 | 6/2003 | Alarcon-Luther et al. |
| 2003/0163373 A1 | 8/2003 | Cornateanu |
| 2003/0163787 A1 | 8/2003 | Hay et al. |
| 2003/0171990 A1 | 9/2003 | Rao et al. |
| 2003/0182204 A1 | 9/2003 | Rhee |
| 2003/0217005 A1 | 11/2003 | Drummond et al. |
| 2003/0220835 A1 | 11/2003 | Barnes, Jr. |
| 2004/0006478 A1 | 1/2004 | Alpdemir et al. |
| 2004/0010597 A1 | 1/2004 | Kirschner et al. |
| 2004/0021584 A1 | 2/2004 | Hartz, Jr. et al. |
| 2004/0024638 A1 | 2/2004 | Restis |
| 2004/0024709 A1 | 2/2004 | Yu et al. |
| 2004/0030598 A1 | 2/2004 | Boal |
| 2004/0064373 A1 | 4/2004 | Shannon |
| 2004/0083184 A1 | 4/2004 | Tsuei et al. |
| 2004/0117250 A1 | 6/2004 | Lubow et al. |
| 2004/0122736 A1 | 6/2004 | Strock et al. |
| 2004/0128197 A1 | 7/2004 | Bam et al. |
| 2004/0220964 A1 | 11/2004 | Shiftan et al. |
| 2004/0238622 A1 | 12/2004 | Freiberg |
| 2004/0243468 A1 | 12/2004 | Cohagan et al. |
| 2004/0260653 A1 | 12/2004 | Tsuei et al. |
| 2005/0021363 A1 | 1/2005 | Stimson et al. |
| 2005/0108096 A1 | 5/2005 | Burger et al. |
| 2005/0149436 A1 | 7/2005 | Elterich |
| 2005/0160014 A1 | 7/2005 | Moss et al. |
| 2005/0165682 A1 | 7/2005 | Duke |
| 2005/0197919 A1 | 9/2005 | Robertson |
| 2005/0209921 A1 | 9/2005 | Roberts et al. |
| 2005/0222961 A1 | 10/2005 | Staib et al. |
| 2005/0228717 A1 | 10/2005 | Gusler et al. |
| 2005/0240478 A1 | 10/2005 | Lubow et al. |
| 2006/0027647 A1 | 2/2006 | Deane et al. |
| 2006/0036868 A1 | 2/2006 | Cicchitto |
| 2006/0100951 A1 | 5/2006 | Mylet et al. |
| 2006/0142058 A1 | 6/2006 | Elias et al. |
| 2006/0169764 A1 | 8/2006 | Ross et al. |
| 2006/0287004 A1 | 12/2006 | Fuqua |
| 2006/0289621 A1 | 12/2006 | Foss et al. |
| 2006/0293956 A1 | 12/2006 | Walker et al. |
| 2007/0005427 A1 | 1/2007 | Walker et al. |
| 2007/0017976 A1 | 1/2007 | Peyret et al. |
| 2007/0055594 A1 | 3/2007 | Rivest et al. |
| 2007/0069013 A1 | 3/2007 | Seifert et al. |
| 2007/0073589 A1 | 3/2007 | Vergeyle et al. |
| 2007/0094080 A1 | 4/2007 | Wiken |
| 2007/0094088 A1 | 4/2007 | Mastie et al. |
| 2007/0100773 A1 | 5/2007 | Wallach |
| 2007/0140595 A1 | 6/2007 | Taylor et al. |
| 2007/0150369 A1 | 6/2007 | Zivin |
| 2007/0156842 A1 | 7/2007 | Vermeulen et al. |
| 2007/0194884 A1 | 8/2007 | Didier et al. |
| 2007/0215696 A1 | 9/2007 | Macnish |
| 2007/0219852 A1 | 9/2007 | Anglum |
| 2007/0219984 A1 | 9/2007 | Aravamudan et al. |
| 2007/0223706 A1 | 9/2007 | Gantman et al. |
| 2007/0228157 A1 | 10/2007 | Eckert |
| 2007/0244741 A1 | 10/2007 | Blume et al. |
| 2007/0250920 A1 | 10/2007 | Lindsay |
| 2007/0271141 A1 | 11/2007 | Storm |
| 2007/0272740 A1 | 11/2007 | Palacios |
| 2007/0288372 A1 | 12/2007 | Behar et al. |
| 2008/0010200 A1 | 1/2008 | Smith et al. |
| 2008/0011837 A1 | 1/2008 | Wesley |
| 2008/0019534 A1 | 1/2008 | Reichelt et al. |
| 2008/0040278 A1 | 2/2008 | DeWitt |
| 2008/0059303 A1 | 3/2008 | Fordyce |
| 2008/0065490 A1 | 3/2008 | Novick et al. |
| 2008/0067232 A1 | 3/2008 | Whytock et al. |
| 2008/0077486 A1 | 3/2008 | Davis et al. |
| 2008/0089499 A1 | 4/2008 | Hahn et al. |
| 2008/0091528 A1 | 4/2008 | Rampell et al. |
| 2008/0109319 A1 | 5/2008 | Foss |
| 2008/0120155 A1 | 5/2008 | Pliha |
| 2008/0133325 A1 | 6/2008 | De et al. |
| 2008/0140509 A1 | 6/2008 | Amjadi |
| 2008/0147504 A1 | 6/2008 | Suk |
| 2008/0154676 A1 | 6/2008 | Suk |
| 2008/0162279 A1 | 7/2008 | Hershkovitz et al. |
| 2008/0162338 A1 | 7/2008 | Samuels et al. |
| 2008/0162589 A1 | 7/2008 | Rodeheffer et al. |
| 2008/0167965 A1 | 7/2008 | Von Nothaus et al. |
| 2008/0177624 A9 | 7/2008 | Dohse |
| 2008/0189210 A1 | 8/2008 | Sawhney |
| 2008/0195499 A1 | 8/2008 | Meredith et al. |
| 2008/0214210 A1 | 9/2008 | Rasanen et al. |
| 2008/0228637 A1 | 9/2008 | Scipioni et al. |
| 2008/0240702 A1 | 10/2008 | Wassingbo et al. |
| 2008/0248815 A1 | 10/2008 | Busch |
| 2008/0257958 A1 | 10/2008 | Rothwell et al. |
| 2008/0262928 A1 | 10/2008 | Michaelis |
| 2008/0268876 A1 | 10/2008 | Gelfand et al. |

(56) References Cited

U.S. PATENT DOCUMENTS

| | | |
|---|---|---|
| 2008/0270243 A1 | 10/2008 | Lewis et al. |
| 2008/0293397 A1 | 11/2008 | Gajdos et al. |
| 2008/0300973 A1 | 12/2008 | DeWitt et al. |
| 2008/0301112 A1 | 12/2008 | Wu |
| 2008/0306826 A1 | 12/2008 | Kramer et al. |
| 2008/0319889 A1 | 12/2008 | Hammad |
| 2009/0002630 A1 | 1/2009 | Lacombe et al. |
| 2009/0005146 A9 | 1/2009 | Kelly et al. |
| 2009/0005152 A9 | 1/2009 | Kelly et al. |
| 2009/0005158 A9 | 1/2009 | Kelly et al. |
| 2009/0005170 A9 | 1/2009 | Kelly et al. |
| 2009/0006191 A1 | 1/2009 | Arankalle et al. |
| 2009/0006203 A1 | 1/2009 | Fordyce, III et al. |
| 2009/0006212 A1 | 1/2009 | Krajicek et al. |
| 2009/0006230 A1 | 1/2009 | Lyda et al. |
| 2009/0019534 A1 | 1/2009 | Bakshi et al. |
| 2009/0037275 A1 | 2/2009 | Pollio |
| 2009/0057396 A1 | 3/2009 | Barbour et al. |
| 2009/0076934 A1 | 3/2009 | Shahbazi et al. |
| 2009/0089131 A1 | 4/2009 | Moukas et al. |
| 2009/0094125 A1 | 4/2009 | Killian et al. |
| 2009/0100529 A1 | 4/2009 | Livnat et al. |
| 2009/0102859 A1 | 4/2009 | Athsani et al. |
| 2009/0119174 A1 | 5/2009 | Pfister |
| 2009/0119190 A1 | 5/2009 | Realini |
| 2009/0140839 A1 | 6/2009 | Bishop et al. |
| 2009/0144164 A1 | 6/2009 | Wane et al. |
| 2009/0150211 A1 | 6/2009 | Bayne |
| 2009/0150265 A1 | 6/2009 | Keld |
| 2009/0150286 A1 | 6/2009 | Barton |
| 2009/0164327 A1 | 6/2009 | Bishop et al. |
| 2009/0171850 A1 | 7/2009 | Yuval |
| 2009/0182630 A1 | 7/2009 | Otto et al. |
| 2009/0182748 A1 | 7/2009 | Walker |
| 2009/0186699 A9 | 7/2009 | Kelly |
| 2009/0192873 A1 | 7/2009 | Marble |
| 2009/0204511 A1 | 8/2009 | Tsang |
| 2009/0222657 A1 | 9/2009 | Bender et al. |
| 2009/0250515 A1 | 10/2009 | Todd et al. |
| 2009/0287557 A1 | 11/2009 | Etheredge et al. |
| 2009/0287564 A1 | 11/2009 | Bishop et al. |
| 2009/0292605 A1 | 11/2009 | Kniaz et al. |
| 2009/0313109 A1 | 12/2009 | Bous et al. |
| 2010/0010918 A1 | 1/2010 | Hunt |
| 2010/0030578 A1 | 2/2010 | Siddique et al. |
| 2010/0030654 A1 | 2/2010 | Dinkin et al. |
| 2010/0036741 A1 | 2/2010 | Cleven |
| 2010/0042477 A1 | 2/2010 | Cavander et al. |
| 2010/0051689 A1 | 3/2010 | Diamond |
| 2010/0057620 A1 | 3/2010 | Li et al. |
| 2010/0064345 A1 | 3/2010 | Bentley et al. |
| 2010/0070359 A1 | 3/2010 | Heasley et al. |
| 2010/0076819 A1 | 3/2010 | Wannier et al. |
| 2010/0076836 A1 | 3/2010 | Giordano et al. |
| 2010/0088166 A1 | 4/2010 | Tollinger |
| 2010/0096449 A1 | 4/2010 | Denzer et al. |
| 2010/0122274 A1 | 5/2010 | Gillies et al. |
| 2010/0122333 A1 | 5/2010 | Noe |
| 2010/0130226 A1 | 5/2010 | Arrasvuori et al. |
| 2010/0145784 A1 | 6/2010 | Sriver et al. |
| 2010/0153205 A1 | 6/2010 | Retter et al. |
| 2010/0161600 A1 | 6/2010 | Higgins et al. |
| 2010/0185529 A1 | 7/2010 | Chesnut et al. |
| 2010/0223165 A1 | 9/2010 | Calman et al. |
| 2010/0228776 A1 | 9/2010 | Melkote et al. |
| 2010/0241571 A1 | 9/2010 | McDonald |
| 2010/0250338 A1 | 9/2010 | Banerjee et al. |
| 2010/0250581 A1 | 9/2010 | Chau |
| 2010/0257066 A1 | 10/2010 | Jones et al. |
| 2010/0257099 A1 | 10/2010 | Bonalle et al. |
| 2010/0268645 A1 | 10/2010 | Martino et al. |
| 2010/0293099 A1 | 11/2010 | Pauker et al. |
| 2010/0299195 A1 | 11/2010 | Nix et al. |
| 2010/0306080 A1 | 12/2010 | Trandal et al. |
| 2010/0312636 A1 | 12/2010 | Coulter et al. |
| 2011/0004921 A1 | 1/2011 | Homer et al. |
| 2011/0010238 A1 | 1/2011 | Postrel |
| 2011/0022483 A1 | 1/2011 | Hammad |
| 2011/0022540 A1 | 1/2011 | Stern et al. |
| 2011/0029364 A1 | 2/2011 | Roeding et al. |
| 2011/0029368 A1 | 2/2011 | Hsu et al. |
| 2011/0034176 A1 | 2/2011 | Lord et al. |
| 2011/0077046 A1 | 3/2011 | Durand et al. |
| 2011/0087531 A1 | 4/2011 | Winters et al. |
| 2011/0093318 A1 | 4/2011 | Guday et al. |
| 2011/0093326 A1 | 4/2011 | Bous et al. |
| 2011/0099104 A1 | 4/2011 | Nybom |
| 2011/0106622 A1 | 5/2011 | Kuhlman et al. |
| 2011/0112897 A1 | 5/2011 | Tietzen et al. |
| 2011/0119155 A1 | 5/2011 | Hammed et al. |
| 2011/0131107 A1 | 6/2011 | Hurst |
| 2011/0137804 A1 | 6/2011 | Peterson |
| 2011/0166992 A1 | 7/2011 | Dessert et al. |
| 2011/0191159 A1 | 8/2011 | Heitman et al. |
| 2011/0191184 A1 | 8/2011 | Blackhurst et al. |
| 2011/0197200 A1 | 8/2011 | Huang et al. |
| 2011/0202466 A1 | 8/2011 | Carter |
| 2011/0218907 A1 | 9/2011 | Dessert et al. |
| 2011/0251892 A1 | 10/2011 | Laracey |
| 2011/0276430 A1 | 11/2011 | Vyas et al. |
| 2011/0276437 A1 | 11/2011 | Mullen et al. |
| 2011/0277016 A1 | 11/2011 | Hockings et al. |
| 2011/0288996 A1 | 11/2011 | Kreutz et al. |
| 2011/0294066 A1 | 12/2011 | Hasegawa |
| 2011/0295744 A1 | 12/2011 | Wisniewski et al. |
| 2011/0320255 A1 | 12/2011 | Gorowitz et al. |
| 2012/0003002 A1 | 1/2012 | Hashimoto |
| 2012/0024947 A1 | 2/2012 | Naelon |
| 2012/0030043 A1 | 2/2012 | Ross et al. |
| 2012/0030047 A1 | 2/2012 | Fuentes et al. |
| 2012/0030109 A1 | 2/2012 | Dooley Maley et al. |
| 2012/0054000 A1 | 3/2012 | Boppert et al. |
| 2012/0054057 A1 | 3/2012 | O'Connell et al. |
| 2012/0059701 A1 | 3/2012 | Van der Veen et al. |
| 2012/0100915 A1 | 4/2012 | Margalit et al. |
| 2012/0110646 A1 | 5/2012 | Ajitomi et al. |
| 2012/0130785 A1 | 5/2012 | Postrel |
| 2012/0131828 A1 | 5/2012 | August et al. |
| 2012/0136780 A1 | 5/2012 | El-Awady et al. |
| 2012/0143759 A1 | 6/2012 | Ritorto, Jr. et al. |
| 2012/0150643 A1 | 6/2012 | Wolfe et al. |
| 2012/0150731 A1 | 6/2012 | Isaacson et al. |
| 2012/0150740 A1 | 6/2012 | Isaacson et al. |
| 2012/0158525 A1 | 6/2012 | Kae et al. |
| 2012/0158540 A1 | 6/2012 | Ganti et al. |
| 2012/0158586 A1 | 6/2012 | Ganti et al. |
| 2012/0160912 A1 | 6/2012 | Laracey |
| 2012/0166334 A1 | 6/2012 | Kimberg et al. |
| 2012/0171237 A1 | 7/2012 | Ching et al. |
| 2012/0179558 A1 | 7/2012 | Fischer |
| 2012/0191565 A1 | 7/2012 | Blank et al. |
| 2012/0197742 A1 | 8/2012 | Johnson |
| 2012/0197743 A1 | 8/2012 | Grigg et al. |
| 2012/0197794 A1 | 8/2012 | Grigg et al. |
| 2012/0203644 A1 | 8/2012 | Phillips |
| 2012/0203700 A1 | 8/2012 | Ornce et al. |
| 2012/0221397 A1 | 8/2012 | Roe et al. |
| 2012/0221446 A1 | 8/2012 | Grigg et al. |
| 2012/0226604 A1 | 9/2012 | Isaacson et al. |
| 2012/0239531 A1 | 9/2012 | McCann |
| 2012/0252365 A1 | 10/2012 | Lam |
| 2012/0254941 A1 | 10/2012 | Levien et al. |
| 2012/0260318 A1 | 10/2012 | Fromentoux et al. |
| 2012/0271712 A1 | 10/2012 | Katzin et al. |
| 2012/0284107 A1 | 11/2012 | Gernaat et al. |
| 2012/0290389 A1 | 11/2012 | Greenough et al. |
| 2012/0290482 A1 | 11/2012 | Atef et al. |
| 2012/0310826 A1 | 12/2012 | Chatterjee |
| 2012/0316941 A1 | 12/2012 | Moshfeghi |
| 2012/0316949 A1 | 12/2012 | Chen |
| 2012/0316992 A1 | 12/2012 | Oborne |
| 2012/0317034 A1 | 12/2012 | Guha et al. |
| 2012/0323765 A1 | 12/2012 | Spaulding et al. |
| 2012/0323783 A1 | 12/2012 | Canetto |

(56) References Cited

U.S. PATENT DOCUMENTS

| | | |
|---|---|---|
| 2012/0330846 A1 | 12/2012 | Light et al. |
| 2013/0009547 A1 | 1/2013 | Shiu et al. |
| 2013/0013499 A1 | 1/2013 | Kalgi |
| 2013/0018738 A1 | 1/2013 | Faires et al. |
| 2013/0024360 A1 | 1/2013 | Ballout |
| 2013/0024525 A1 | 1/2013 | Brady et al. |
| 2013/0036001 A1 | 2/2013 | Wegner et al. |
| 2013/0036048 A1 | 2/2013 | Campos et al. |
| 2013/0036117 A1 | 2/2013 | Fisher et al. |
| 2013/0046589 A1 | 2/2013 | Grigg et al. |
| 2013/0046635 A1 | 2/2013 | Grigg et al. |
| 2013/0054336 A1 | 2/2013 | Graylin |
| 2013/0054470 A1 | 2/2013 | Campos et al. |
| 2013/0060689 A1 | 3/2013 | Oskolkov et al. |
| 2013/0060708 A1 | 3/2013 | Oskolkov et al. |
| 2013/0073377 A1 | 3/2013 | Heath |
| 2013/0073473 A1 | 3/2013 | Heath |
| 2013/0080239 A1 | 3/2013 | Okerlund |
| 2013/0085927 A1 | 4/2013 | Scott |
| 2013/0097002 A1 | 4/2013 | Dishneau et al. |
| 2013/0097683 A1 | 4/2013 | Davis et al. |
| 2013/0110658 A1 | 5/2013 | Lyman et al. |
| 2013/0124346 A1 | 5/2013 | Baldwin et al. |
| 2013/0159178 A1 | 6/2013 | Colon et al. |
| 2013/0159195 A1 | 6/2013 | Kirillin et al. |
| 2013/0161381 A1 | 6/2013 | Roundtree et al. |
| 2013/0166332 A1 | 6/2013 | Hammad |
| 2013/0179341 A1 | 7/2013 | Boudreau |
| 2013/0179954 A1 | 7/2013 | Bidare |
| 2013/0191195 A1 | 7/2013 | Carlson et al. |
| 2013/0191213 A1 | 7/2013 | Beck et al. |
| 2013/0191227 A1 | 7/2013 | Pasa et al. |
| 2013/0204775 A1 | 8/2013 | Midkiff et al. |
| 2013/0204787 A1 | 8/2013 | Dubois |
| 2013/0212007 A1 | 8/2013 | Mattsson et al. |
| 2013/0212019 A1 | 8/2013 | Mattsson et al. |
| 2013/0246258 A1 | 9/2013 | Dessert |
| 2013/0246260 A1 | 9/2013 | Barten et al. |
| 2013/0254052 A1 | 9/2013 | Royyuru et al. |
| 2013/0254102 A1 | 9/2013 | Royyuru |
| 2013/0254115 A1 | 9/2013 | Pasa et al. |
| 2013/0262315 A1 | 10/2013 | Hruska |
| 2013/0268437 A1 | 10/2013 | Desai et al. |
| 2013/0304651 A1 | 11/2013 | Smith |
| 2013/0311324 A1 | 11/2013 | Stoll et al. |
| 2013/0318627 A1 | 11/2013 | Lundkvist et al. |
| 2013/0325751 A1 | 12/2013 | McDonough et al. |
| 2013/0334304 A1 | 12/2013 | Yankovich et al. |
| 2013/0346302 A1 | 12/2013 | Purves et al. |
| 2014/0006273 A1 | 1/2014 | Gopinath et al. |
| 2014/0012647 A1 | 1/2014 | Hecht |
| 2014/0025581 A1 | 1/2014 | Calman |
| 2014/0025958 A1 | 1/2014 | Calman |
| 2014/0027922 A1 | 1/2014 | Uzoh |
| 2014/0058938 A1 | 2/2014 | McClung, III |
| 2014/0092130 A1 | 4/2014 | Anderson et al. |
| 2014/0096215 A1 | 4/2014 | Hessler |
| 2014/0123244 A1 | 5/2014 | Resch et al. |
| 2014/0129357 A1 | 5/2014 | Goodwin |
| 2014/0130127 A1 | 5/2014 | Toole et al. |
| 2014/0143145 A1 | 5/2014 | Kortina et al. |
| 2014/0143149 A1 | 5/2014 | Aissi |
| 2014/0164030 A1 | 6/2014 | Katagiri |
| 2014/0172707 A1 | 6/2014 | Kuntagod et al. |
| 2014/0187148 A1 | 7/2014 | Taite et al. |
| 2014/0188719 A1 | 7/2014 | Poornachandran et al. |
| 2014/0208401 A1 | 7/2014 | Balakrishnan et al. |
| 2014/0214640 A1 | 7/2014 | Mallikarjunan et al. |
| 2014/0244493 A1 | 8/2014 | Kenyon et al. |
| 2014/0244503 A1 | 8/2014 | Sadlier |
| 2014/0244506 A1* | 8/2014 | Gramling ............... G06Q 20/40 705/44 |
| 2014/0245391 A1 | 8/2014 | Adenuga |
| 2014/0245411 A1 | 8/2014 | Meng et al. |
| 2014/0250009 A1 | 9/2014 | Carlson |
| 2014/0278999 A1 | 9/2014 | Calman et al. |
| 2014/0279005 A1 | 9/2014 | Calman et al. |
| 2014/0279214 A1 | 9/2014 | Wagoner-Edwards et al. |
| 2014/0279476 A1 | 9/2014 | Hua |
| 2014/0279554 A1 | 9/2014 | Priebatsch et al. |
| 2014/0279566 A1 | 9/2014 | Verma et al. |
| 2014/0297411 A1 | 10/2014 | Peil |
| 2014/0310764 A1 | 10/2014 | Tippett et al. |
| 2014/0315159 A1 | 10/2014 | Mukherjee et al. |
| 2014/0324690 A1 | 10/2014 | Allen et al. |
| 2014/0330721 A1 | 11/2014 | Wang |
| 2014/0337175 A1 | 11/2014 | Katzin et al. |
| 2014/0359709 A1 | 12/2014 | Nassar et al. |
| 2015/0019317 A1 | 1/2015 | Mitchell |
| 2015/0019439 A1 | 1/2015 | Phillips |
| 2015/0032621 A1 | 1/2015 | Kar et al. |
| 2015/0032627 A1 | 1/2015 | Dill et al. |
| 2015/0039601 A1 | 2/2015 | Harrang et al. |
| 2015/0046339 A1 | 2/2015 | Wong et al. |
| 2015/0081557 A1 | 3/2015 | Kinfoil et al. |
| 2015/0081567 A1 | 3/2015 | Boyle et al. |
| 2015/0089615 A1 | 3/2015 | Krawczyk et al. |
| 2015/0100495 A1 | 4/2015 | Salama et al. |
| 2015/0100788 A1 | 4/2015 | Chastain et al. |
| 2015/0120569 A1 | 4/2015 | Belshe et al. |
| 2015/0120572 A1 | 4/2015 | Slade |
| 2015/0145656 A1 | 5/2015 | Levesque et al. |
| 2015/0161610 A1 | 6/2015 | Sahadevan et al. |
| 2015/0170149 A1 | 6/2015 | Sharma et al. |
| 2015/0172242 A1 | 6/2015 | Goncalves |
| 2015/0172411 A1 | 6/2015 | Maier et al. |
| 2015/0206131 A1 | 7/2015 | Phillips et al. |
| 2015/0206137 A1 | 7/2015 | Mazarim Fernandes |
| 2015/0220914 A1 | 8/2015 | Purves et al. |
| 2015/0254648 A1 | 9/2015 | Clements et al. |
| 2015/0254653 A1 | 9/2015 | Bondesen et al. |
| 2015/0254664 A1 | 9/2015 | Bondesen et al. |
| 2015/0254698 A1 | 9/2015 | Bondesen et al. |
| 2015/0278903 A1* | 10/2015 | Amjadi ............... G06Q 30/0625 705/26.62 |
| 2015/0294303 A1 | 10/2015 | Hanson et al. |
| 2015/0348006 A1 | 12/2015 | Taveau et al. |
| 2016/0019536 A1 | 1/2016 | Ortiz et al. |
| 2016/0029204 A1* | 1/2016 | Lalwaney ............... H04W 8/22 455/418 |
| 2016/0125677 A1 | 5/2016 | Williams et al. |
| 2016/0162853 A1 | 6/2016 | Blackhurst et al. |
| 2016/0162868 A1 | 6/2016 | Blackhurst et al. |
| 2016/0171570 A1 | 6/2016 | Dogin et al. |
| 2016/0189228 A1 | 6/2016 | Vaccari |
| 2016/0232518 A1 | 8/2016 | Butler, IV |
| 2016/0232607 A1 | 8/2016 | Spielman |
| 2016/0261409 A1 | 9/2016 | French et al. |
| 2017/0018013 A1 | 1/2017 | Faust et al. |
| 2017/0039568 A1 | 2/2017 | Tunnell et al. |
| 2017/0068952 A1 | 3/2017 | Brockmann et al. |
| 2017/0083966 A1 | 3/2017 | Raman |
| 2017/0109540 A1 | 4/2017 | Heiman et al. |
| 2017/0109741 A1 | 4/2017 | Heiman et al. |
| 2017/0111345 A1 | 4/2017 | Heiman et al. |
| 2017/0193501 A1* | 7/2017 | Cole ..................... G06Q 20/401 |
| 2017/0195994 A1* | 7/2017 | Cole ..................... G06Q 40/02 |
| 2017/0309306 A1* | 12/2017 | Thomas .................. H04L 63/10 |
| 2018/0034862 A1* | 2/2018 | Friend ................. H04L 65/1063 |
| 2018/0082284 A1* | 3/2018 | Gomes .................. G06Q 20/36 |
| 2018/0191797 A1 | 7/2018 | Javier et al. |
| 2018/0285827 A1 | 10/2018 | Dotan-Cohen et al. |
| 2018/0352599 A1* | 12/2018 | Bostick .................. H04L 12/14 |

OTHER PUBLICATIONS

Zumiez.com. "The Zumiez Gift Card—CombineYour Gift Cards." 1 page.http://www.zumiez.com/giftcard/index/combine. Retrieved Jan. 8, 2013.

The Laws, Regulations, Guidelines, and Industry Practices that Consumers Who Use Gift Cards; Phillip Keitel; Jul. 2008.

MasterCard 2005.

PrePaid Gift Cards; May 2012.

(56) References Cited

OTHER PUBLICATIONS

Simon, "Credit-Card Reward Programs: A Short History"; Creditcards. com, Nov. 2, 4 pages.
Lane, "History of APIs"; APIEvangelist.com; Dec. 2012, 11 pages.
"Digital Wallet to Pay for Travel Hasn't Arrived Yet", Orlando Sentinel[Orlando FL], Jan. 27, 2013; p. J.6.
"World's First and Only Global Wallet Sees Strong User Adoption with 150 Million Miles Loaded to Cash in First Month of Launch", Business Wire, Nov. 28, 2012, Zurich.
Bielski, L. (2000). Aggregators aka "screenscrapers". American Bankers Association.ABA Banking Journal, 92(5), 47-50. Retrieved from http://search.proquest.com/docview/218443115?ac-countid=14753.
Howell, J., & Wei, J. (2010). Value Increasing Model in Commercial E-Banking. The Journal of Computer Information Systems, 51(1), 72-81. Retrieved from http://search.proquest.com/docview/ 808409721?accountid=14753.
Finovate Startup 2009 Video Archives >> Expensify (retrieved online from <http://www.finovate.com/startup09vid/expensify. html>and<http://www.finovate.com/startup09vid/videos/ quicktime/ Expensify.mov>) pp. 1-3 screenshots of website hosting video presentation. pp. 4-15 screen shots of the Expensify video presentation.
Expensify Blog Oct. 2009, retrieved online from <http://blog. expensify.com/2009/10/>> pp. 8.
International Search Report and the Written Opinion for International Application No. PCT/US2010/029811 dated Jun. 1, 2010.
International Preliminary Report on Patentability for International Application No. PCT/US2010/029811 dated Oct. 20, 2011.
Welch, M. J. (2010). Addressing the challenges of underspecification in web search. (Order No. 3446833, University of California, Los Angeles). ProQuest Dissertations and Theses, 137. Retrieved from http://search.proquest.com/docview/85810500?accountid= 14753. (858101500).
K.J. Jeevan, & Padhi, P. (2006). A selective review of research in content personalization. Library Review, 55(9), 556-586. doi:http:// dx.doi.org/10.1108/00242530610706761.
Lissner, P. A. (2007). Chi-thinking: Chiasmus and cognition. (Order No. 3297307, University of Maryland, College Park). ProQuest Dis-sertations and Theses, 487. Retrieved from http://search. proquest. com/docview/304851937?accountid=14753.(304851937).
International Search Report and Written Opinion for International Application No. PCT/US2012/027892 dated Jun. 14, 2012.
International Search Report and Written Opinion for International Application No. PCT/US2012/027912 dated Jun. 8, 2012.
International Search Report and Written Opinion for International Application No. PCT/US2012/028036 dated May 28, 2012.
International Search Report and Written Opinion for International Application No. PCT/US2012/028008 dated May 22, 2012.
International Search Report and Written Opinion for International Application No. PCT/US2012/048697 dated Sep. 24, 2012.
International Search Report and Written Opinion for International Application No. PCT/US2012/027890 dated Feb. 5, 2013.

* cited by examiner

DATA TRANSMISSION BETWEEN NETWORKED RESOURCES

FIELD OF THE INVENTION

The present invention is generally directed to a system for transmitting data between networked resources.

BACKGROUND

Sending notifications to users requires large quantities of data storage and large amounts of processing capacity. When an entity sends targeted notifications to users, there is a greater likelihood that the users actually take an action associated with the notification, and it reduces the amount of data storage and processing capacity required when compared to non-targeted notification. By sending notifications to a subset of users from a plurality of users (excluding other users), an entity will reduce the data storage and processing capacity without affecting the actions taken on such notifications. Additionally, by sending notifications to users in conjunction with, or as notifications embedded within a relative application, the providing entity will reduce the data storage and processing capacity without affecting the actions taken on such notifications. Therefore, there is a need for a system to more accurately and efficiently provide notifications.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for transmitting data between networked resources. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve a first module stored in the non-volatile memory, executed by the at least one processor, and configured to cause the at least one processor to perform certain functions of the system. As such, the system may electronically receive input information associated with a user, wherein the input information comprises user information associated with the user, the user information comprising account information associated with the user and personal information associated with the user and determine a user profile based on at least the input information.

Furthermore, a second module may be stored in the non-volatile memory, executable by the at least one processor, and configured to cause the at least one processor to perform certain functions of the system. As such, the system may provide a resource entity application to a user for installation on a mobile device of the user, wherein the resource entity application is associated with a resource entity. Additionally, the system can determine supplemental resource information associated with a supplemental resource based on at least the user profile, wherein the supplemental resource is associated with a merchant that has a relationship with the resource entity. In some embodiments, the system establishes, using a computing device processor, a communication link with a mobile device of the user, wherein establishing further comprises creating a wireless data channel with the mobile device of the user and transmits, via the established communication link, the supplemental resource to the mobile device of the user for storage in association with the resource entity application.

In some embodiments, the system also determines that the supplemental resource is associated with a third party application, wherein the third party application is stored on the mobile device of the user or a separate computing device of the user that is in network communication with the mobile device of the user and determines that the third party application has been activated and is in use. In response to determining that the third party application has been activated and is in use, the system may cause the third party application to display a selectable notification of the supplemental resource within the third party application. Additionally, the system may receive an indication from the third party application that the user has selected the selectable notification of the supplemental resource. Subsequently, the system may determine that the user has an interaction with the merchant at a merchant interaction date and apply the supplemental resource to the interaction with the merchant at a future settlement date that is after the merchant interaction date.

In some embodiments of the system, electronically receiving the input information associated with the user further comprises electronically receiving a first input information associated with a user, wherein the first input information comprises user information associated with a user logged into an online banking website, the user information comprising account information associated with the user's financial institution account and personal information associated with the user. In some such embodiments, the system may also be configured to store the first input information in a queue associated with the volatile memory until a second input information is received, wherein queuing further comprises reorganizing the first input information into the volatile memory. The system can then receive second input information associated with the user, wherein the second input information comprises social network information associated with the user and store the second input information in the queue associated with the volatile memory, wherein queuing the second input information further comprises reorganizing the second input information into the volatile memory. Finally, the system can determine the user profile based on at least the first input information and the second input information stored in the queue associated with the volatile memory.

In some embodiments of the system, the supplemental resource comprises an offer, wherein the offer enables the user to receive at least one of a discount or a rebate on a purchase from the merchant that has the relationship with the resource entity. Additionally or alternatively, the interaction with the merchant can be considered a purchase of a product or service associated with the supplemental resource or offer.

For some embodiments of the system, the third party application is one of a map application, a navigation application, a ride-share application, a shopping application, a mobile game application, an augmented reality application, a virtual reality application, a social media application, or a food services application.

Additionally or alternatively, the system may also request authentication credentials of the user, receive the authentication credentials from the mobile device of the user, and authenticate the user to access the supplemental resource within the third party application.

Furthermore, in some embodiments, the system may monitor a location of the mobile device of the user to determine that the location of the mobile device of the user is within a predetermined distance from a location associated with the supplemental resource. In response to determining that the location of the mobile device of the user is within the predetermined distance from the location associated with the supplemental resource, the system may cause the third party application to display the selectable notification of the supplemental resource within the third party application.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
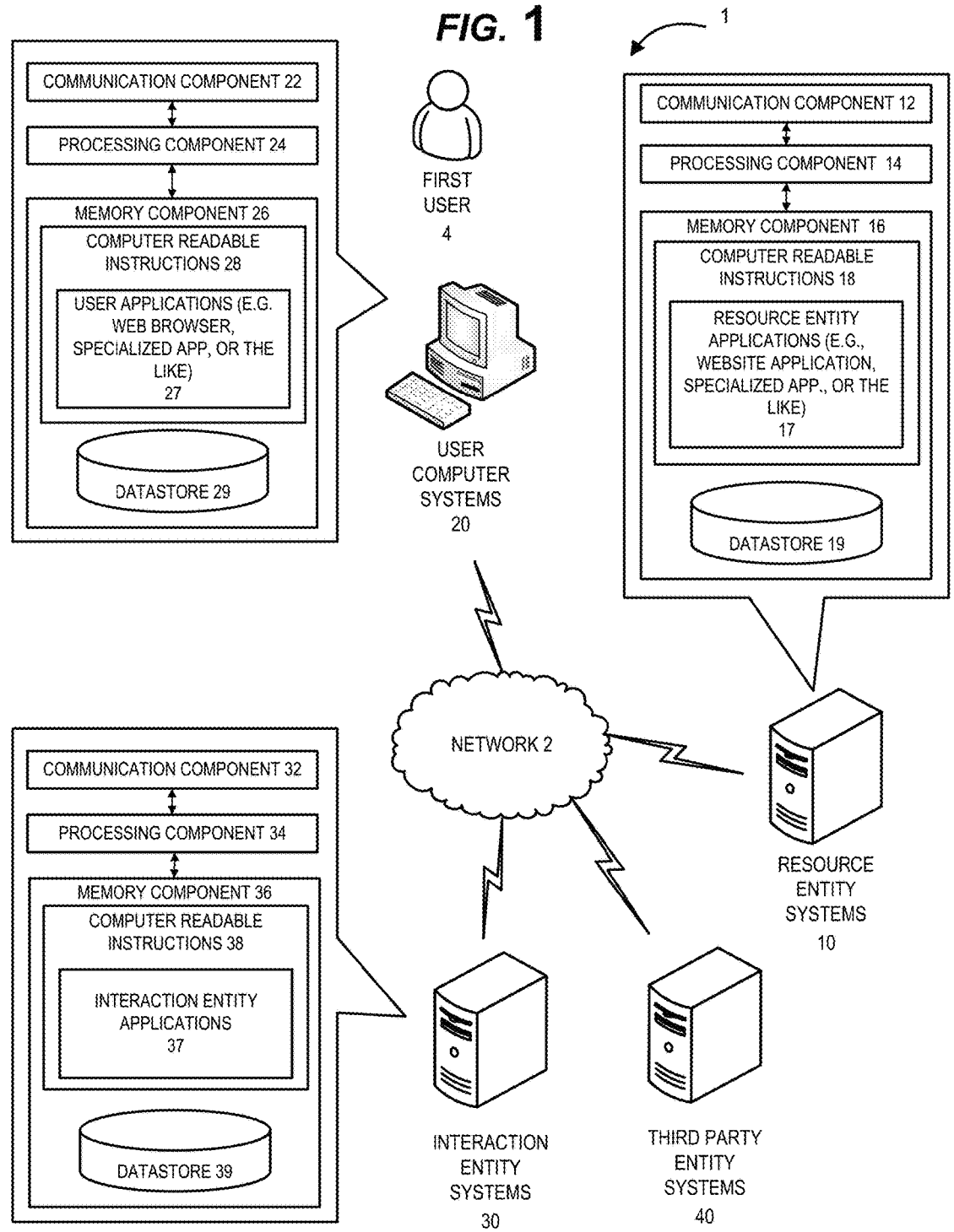
Figure 2:
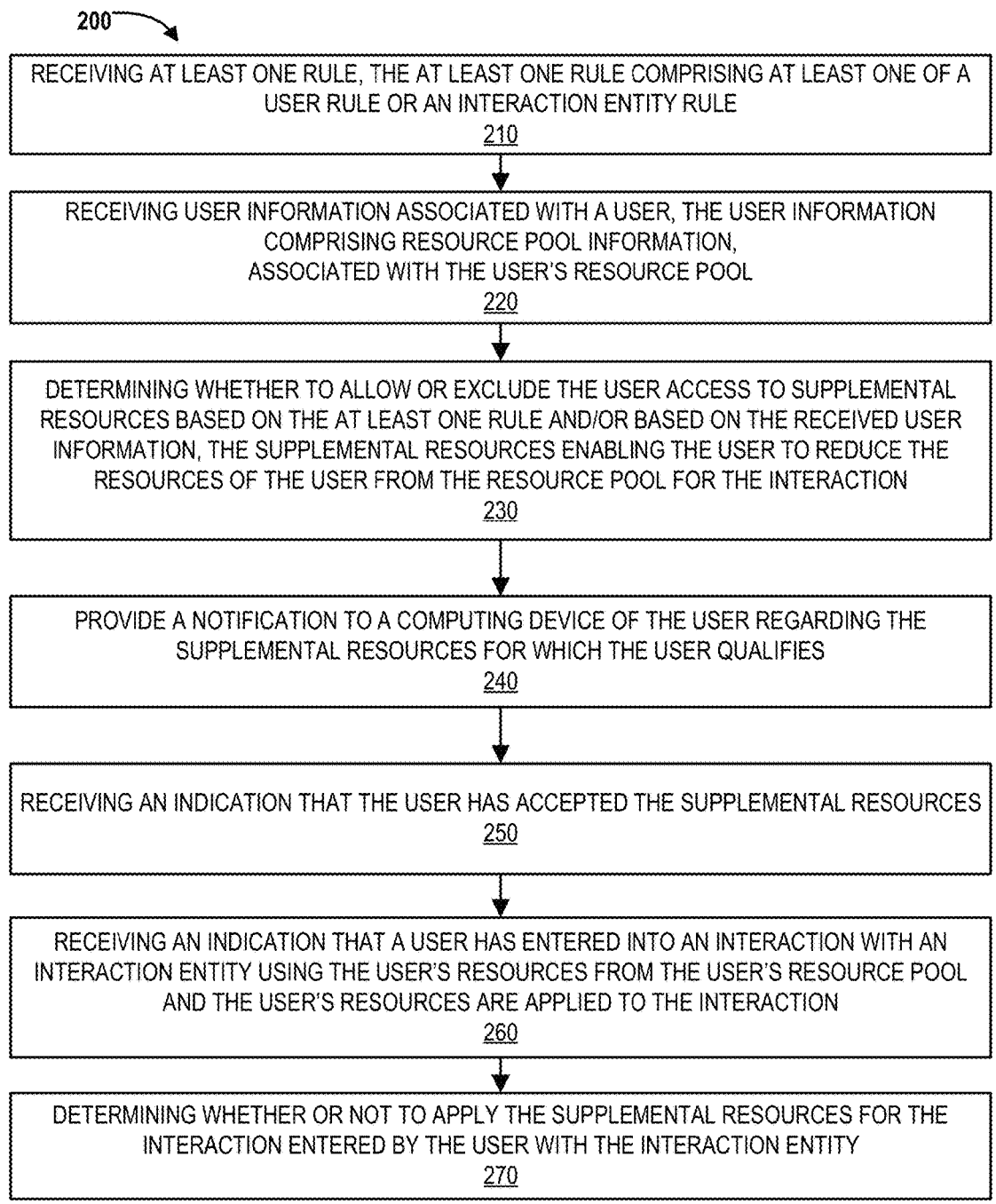
Figure 3:
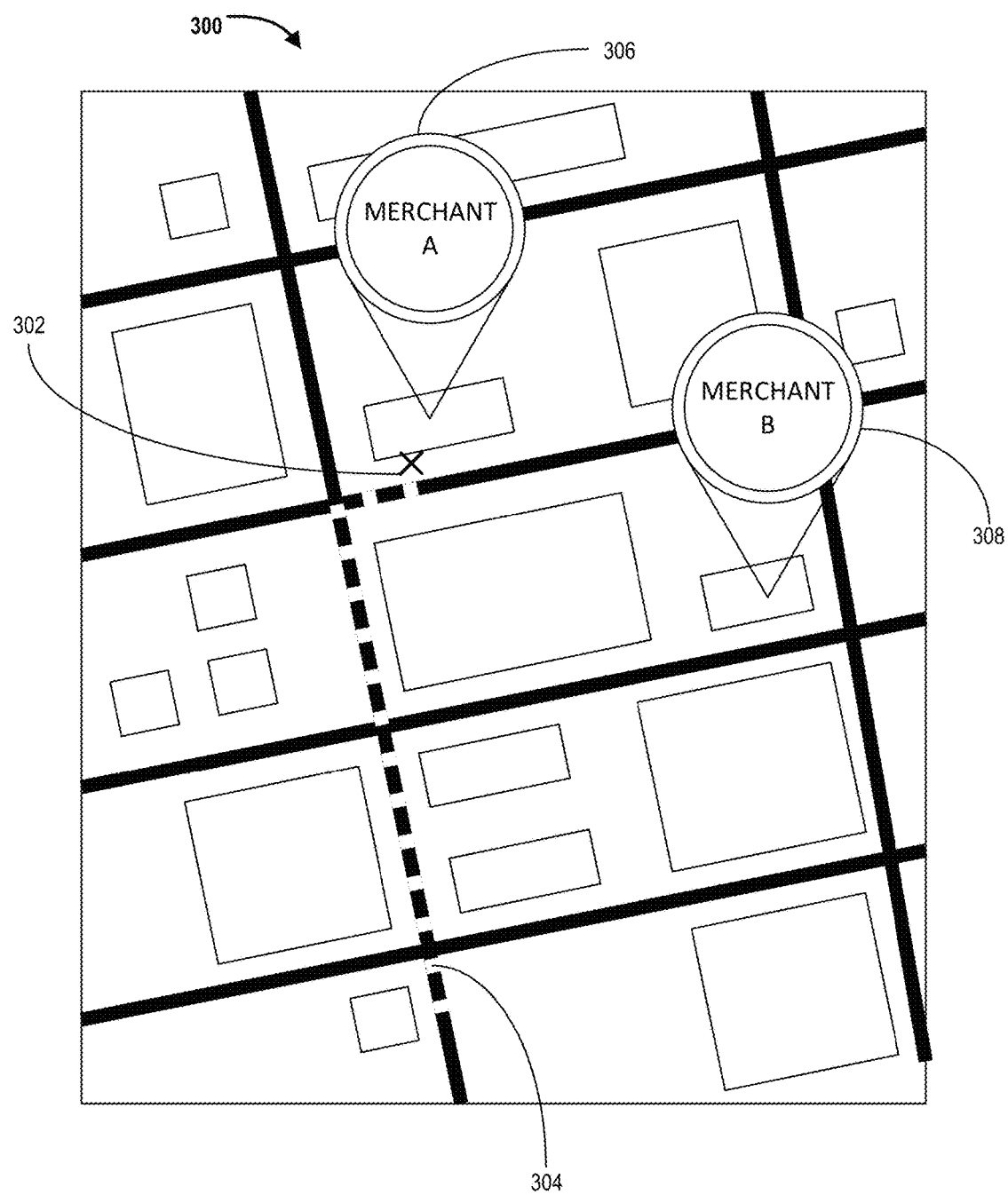
Figure 4:
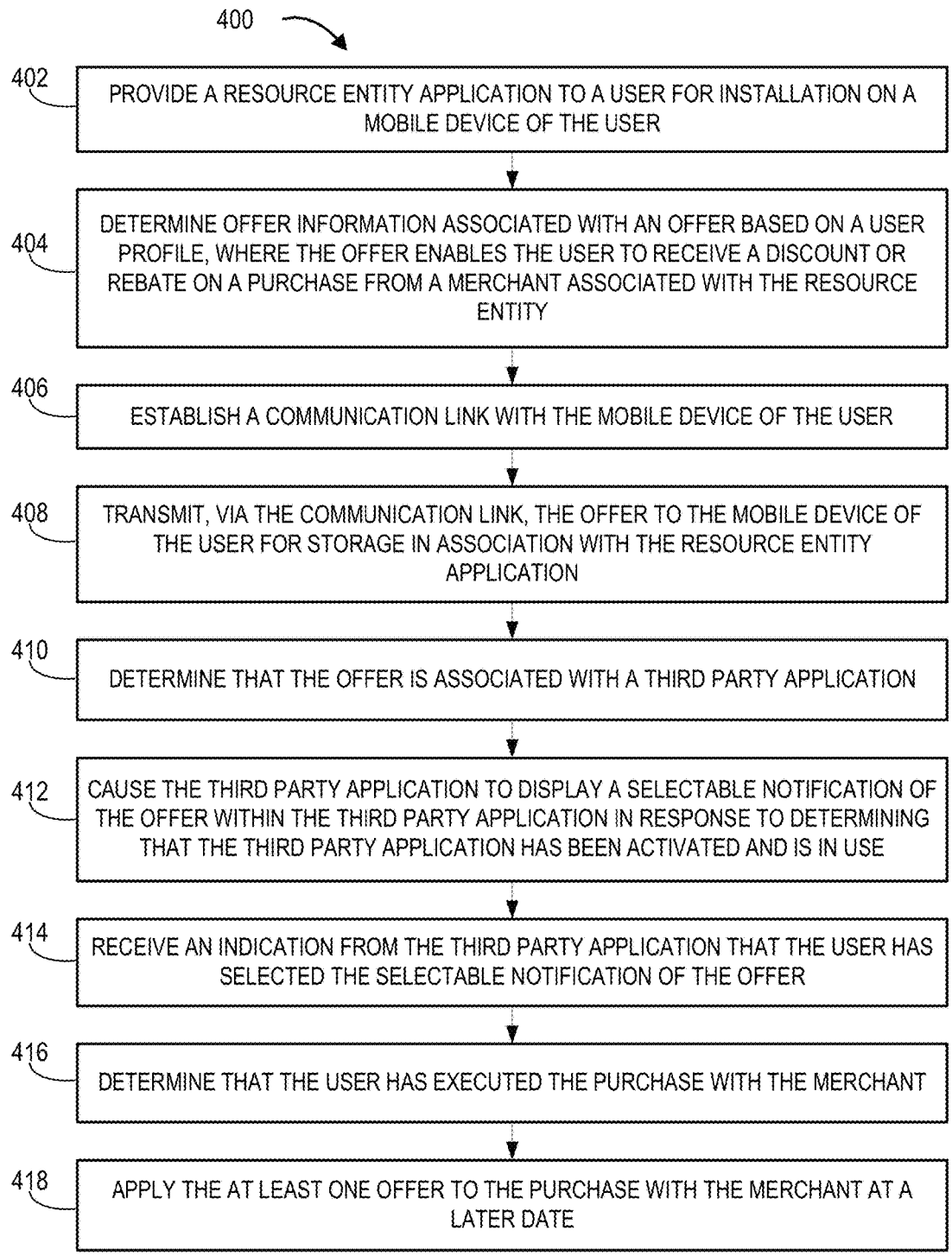

Having thus described embodiments of the invention in general terms, reference will now be made the accompanying drawings, wherein:

FIG. 1 provides a block diagram illustrating a supplemental resource system environment for data transmission between networked resources, in accordance with embodiments of the present invention;

FIG. 2 provides a flowchart illustrating a process for implementing rules-based supplemental resource association, in accordance with embodiments of the present invention;

FIG. 3 provides a sample display for a third party application with selectable notifications associated with supplemental resources, in accordance with embodiments of the present invention; and FIG. 4 provides a flowchart illustrating a process for providing selectable notifications for supplemental resources within third party applications, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system for transmitting data between networked resources. Information about a managing entity's supplemental resource is identified, where the supplemental resource supplements a set of resources associated with a user in response to a determination that a particular interaction has occurred. The supplemental resource is then determined to be associated with a third party entity's application on a computing device of the user. The third party application is adjusted by the managing entity to display a selectable notification of the supplemental resource within the third party application. Once the selectable notification is selected, the managing entity approves the supplemental resource for future use by the user. Once the particular interaction associated with the supplemental resource has occurred, the supplemental resource is applied to the set of resources at a later point in time.

FIG. 1 illustrates a supplemental resource system environment 1, in accordance with embodiments of the invention. As illustrated in FIG. 1, one or more resource entity systems 10 are operatively coupled, via a network 2, to one or more user computer systems 20, one or more interaction entity systems 30, one or more third-party systems 40, and/or one or more other systems (not illustrated). In this way, the user 4 (e.g., one or more associates, employees, agents, contractors, sub-contractors, third-party representatives, customers, or the like), through a user application 27 (e.g., web browser, dedicated or specialized application, or the like), may access resource entity applications 17 (e.g., website, dedicated or specialized computer or mobile device application, or the like) of the resource entity systems 10 to receive supplemental resources for interactions with interaction entities.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the resource entity systems 10 generally comprise one or more communication components 12, one or more processing components 14, and one or more memory components 16. The one or more processing components 14 are operatively coupled to the one or more communication components 12 and the one or more memory components 16. As used herein, the term "processing component" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 2 and other components on the network 2, such as, but not limited to, the components of the user computer systems 20, the interaction entity systems 30, third-party systems 40, or other systems. As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the resource entity systems 10 comprise computer-readable instructions 18 stored in the memory component 16, which in one embodiment includes the computer-readable instructions 18 of the resource entity application 17 (e.g., website application, dedicated application, or the like). In some embodiments, the one or more memory components 16 include one or more data stores 19 for storing data related to the resource entity systems 10, including, but not limited to, data created, accessed, and/or used by the resource entity application 17. The resource entity application 17 may be utilized to provide and/or store not only resources for the user 4, but also supplemental resources for the user, and apply such supplemental resources to the interactions of the user 4.

Furthermore, the resource entity application 17 may store relational or comparative data between the supplemental resources and information about third party applications that are associated with the supplemental resources. In such a way, the resource entity application 17 may be able to search one or more databases for information about a third party application, match this third party application information with one or more of the supplemental resources, and identify the one or more matched supplemental resources as being particularly relevant to the user 4. In some such embodiments, the resource entity application 17 may cause notifications about these one or more supplemental resources to be sent to or otherwise populate within the associated third party applications at some point in time (e.g., automatically, when the third party application is opened, when the third party application is actively being accessed, after authorization credentials associated with the user 4 have been received, or the like.)

As illustrated in FIG. 1, users 4 may access the resource entity application 17, or other applications, through a user computer system 20. The user computer system 20 may be a desktop, mobile device (e.g., laptop, smartphone device, PDA, tablet, or other mobile device), or any other type of computer that generally comprises one or more communication components 22, one or more processing components 24, and one or more memory components 26.

In some embodiments, the user computer system comprises more than one computing device. For example, a first or main computing device (e.g., a device in which the resource entity application 17 is stored) may be a mobile phone associated with the user 4 while a second mobile device (e.g., a device on which a third party application associated with one or more supplemental resources is stored) may be a smart watch that is in some kind of network communication with the mobile phone. In such embodiments, the two mobile devices may be able to communicate with each other (or at least the first device can communicate commands or instructions to the second device) to perform one or more of the steps described herein, as they relate to the process of providing data transmission between networked resources.

The one or more processing components 24 are operatively coupled to the one or more communication components 22, the one or more image capture components 25, and the one or more memory components 26. The one or more processing components 24 use the one or more communication components 22 to communicate with the network 2 and other components on the network 2, such as, but not limited to, the resource entity systems 10, the interaction entity systems 30, third-party systems 40, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 4.

As illustrated in FIG. 1, the user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other apps that allow the user 4 to take various actions, including allowing the user 4 to access applications located on other systems, or the like. In some embodiments, the user 4 utilizes the user applications 27, through the user computer systems 20, to access the resource entity applications 17 to accept supplemental resources. Moreover, in some embodiments the user 4 may also utilize the user applications 27, through the user computer systems 20, to enter into interactions with the interaction entity, through the interaction entity applications 37 and/or interaction entity systems 30.

As illustrated in FIG. 1, one or more interaction entity systems 30 may communicate with the resource entity systems 10 and/or user computer systems 20 to provide supplemental resources to the resource entity and/or to engage in interactions with the user 4. As such, the interaction entity systems 30 are operatively coupled, via a network 2, to the one or more resource entity systems 10, the user computer systems 20, the third party systems 40, and/or other systems. The interaction entity systems 30 generally comprise one or more communication components 32, one or more processing components 34, and one or more memory components 36.

The one or more processing components 34 are operatively coupled to the one or more communication components 32, and the one or more memory components 36. The one or more processing components 34 use the one or more communication components 32 to communicate with the network 2 and other components on the network 2, such as, but not limited to, the components of the resource entity systems 10, the user computer systems 20, the third party systems 40, and/or other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the interaction entity systems 30 may have computer-readable instructions 38 stored in the one or more memory components 36, which in one embodiment includes the computer-readable instructions 38 of interaction entity applications 37 that allow for the interactions with the user 4 and/or the resource entity regarding supplemental resources, as will be described herein.

Moreover, as illustrated in FIG. 1, third party entity systems 40, and/or other like systems are operatively coupled to the resource entity systems 10, the user computer systems 20, and/or the interaction entity systems 30, through the network 2. The third party entity systems 40 and/or other like systems have components the same as or similar to the components described with respect to the resource entity systems 10, the user computer systems 20, and/or the interaction entity systems 30 (e.g., one or more communication components, one or more processing components, and one or more memory devices with computer-readable instructions of one or more applications, one or more datastores, or the like). Thus, the third party systems 40 and/or other like systems communicate with the resource entity systems 10, the user computer systems 20, the interaction entity systems 30, and/or each other in same or similar way as previously described with respect to the resource entity systems 10, the user computer systems 20, and/or the interaction entity systems 30.

The present invention disclosed herein relates generally to a resource entity providing a notification to a computing device of a user that results in the user being able to take an action, such that a user may enter into a future interaction using user's resources from a resource pool and supplemental resources related to the notification and/or action. In some embodiments, the resource entity may be a financial institution and the interaction entity may be a merchant, but it should be understood that the entities may be another third party entity acting on its own or as a third-party for the resource entity or interaction entity. In some embodiments, the resource entity or the interaction entity may be acting on behalf of one another.

The notification may relate to supplemental resources (e.g., and offer, discount, rebate, or the like) that the user may utilize for a product (e.g., good or service) during an interaction (e.g., transaction, or the like) with an interaction entity. The notification may be presented to the user via various channels, such as through the user's online resource pool (e.g., online banking account, or the like), social network account, a third party application (e.g., a mobile device application on the mobile device of the user), email, text message, or other like channel. In some embodiments, the user action may be the acceptance of the notification (e.g., acceptance of the supplemental resources).

When the user accepts the supplemental resources, the supplemental resources are activated so that if the user uses eligible resources from an eligible resource pool (e.g., as determined by the resource entity, the interaction entity, third party entity, or the like) to enter into the interaction, the user receives the benefit associated with the supplemental resources. In other embodiments, the supplemental resources may be automatically activated if the user has previously chosen to automatically activate supplemental resources associated with particular interactions (e.g., associated with particular interaction entities or products). In some embodiments, the resource entity may determine that a user may choose among multiple eligible resources pools in order to enter into an interaction associated with the supplemental resources.

As will be described herein in further detail later, in some embodiments the present invention provides a targeted integrated interface that integrates information related to interactions that the user 4 has with interaction entities with resources used from the resource entities, and provides targeted supplemental resources to the user 4 (e.g., by providing a notification to a computing device of the user 4 or otherwise displaying the targeted supplemental resources on the computing device of the user 4). The targeted supplemental resources may be presented to the user 4 through the targeted integrated interface. Additionally or alternatively, the targeted supplemental resources may be presented to the user 4 as notifications or displays embedded within a third party application (e.g., a mobile device application), or as a pop-up notification that is triggered while the user 4 is accessing the third party application.

The present invention provides at least two different improvements to the technological environment of interactions that occurs over a network 2, such as the Internet. First, the present invention presents a targeted integrated interface that presents targeted supplemental resources to the user 4 in order to keep the user 4 within the resource entity systems 10 and to make the user 4 more likely to use the resources of the resource entity by providing supplemental resources to the user 4 for future interactions with various interaction entity systems 30. This improvement is further bolstered when the supplemental resources are provided via or within a third party application that is associated with the provided supplemental resources. For example, a supplemental resource can be further targeted towards a user 4 (and the user 4 is more likely to actually select the supplemental resource) if the supplemental resource is displayed in response to determining that a ride share mobile device application or a map application is giving instructions on how to get to a specific merchant (store, restaurant, and the like) that is associated with that particular supplemental resource, where the notification about the supplemental resource is actually displayed within that third party platform or application.

Secondly, the present invention reduces the storage and processing capacity required by the resource entity systems 10 to present the targeted supplemental resources to the users 4. Because the targeted integrated interface is utilized to present the targeted supplemental resources to the user 4, the number of notifications presented to the user 4 is greatly reduced because the notifications are specified to the user 4 and the user 4 can select the targeted supplemented resources that the user 4 wants to use.

Referring now to FIG. 2, a general process flow 200 is provided for implementing rules-based supplemental resource association. At block 210, the method comprises receiving at least one rule, the at least one rule comprising at least one of a user rule or an entity rule (e.g., a filtering rule that excludes or allows the user access to supplemental resources based on the user and/or the entities). As used herein, a user rule is a rule that determines the users 4 that can access or that are excluded from the supplemental resources (e.g., allows or excludes some users from receiving and/or using the supplemental resources). In some embodiments, the at least one user rule may comprise an affinity rule. Therefore, if the user 4 and interaction entity already have an existing relationship (e.g., for providing and/or using supplemental resources), these users may be allowed or excluded from receiving the supplemental resources through the resource entity. The affinity rule comprises at least one of a full affinity rule or a partial affinity rule. When the affinity rule comprises a full affinity rule, the user is completely allowed or excluded from receiving supplemental resources if the interaction entity already has an existing relationship with the user 4. When the affinity rule comprises a partial affinity rule, the user 4 is allowed to or excluded from receiving supplemental resources associated with a particular product, category of products, an entity, industry, or the like associated with a particular interaction entity that already has an existing relationship with the user 4 for the particular product, category of products, entity, industry, or the like; however, the user 4 may receive supplemental resources associated with other products, categories of products, entities, industries, or the like associated with the particular entity. Additionally or alternatively, the user 4 may be allowed to or excluded from receiving supplemental resources associated with a competitor of a particular interaction entity if that particular interaction entity already has an existing relationship with the user 4.

In some embodiments, an entity rule is a rule that allows or excludes some interaction entities from providing supplemental resources to users 4 associated with an interaction entity. In some embodiment, the at least one entity rule comprises a category code rule. Therefore, an interaction entity associated with a predetermined category code (e.g., a healthcare code, or the like) is allowed to or excluded from providing supplemental resources. However, the resource entity managing the resource pool of the user 4 may set up a list of interaction entities that trigger exceptions. Interaction entities that trigger exceptions can provide supplemental resources even if these entities are associated with the excluded category codes.

It should be understood that specific user rules and/or entity rules have been described herein; however, any user rules or entity rules may be utilized to determine what users 4 have access to supplemental resources.

At block 220, the method comprises receiving user information associated with a user 4, the user information may comprise resource pool information associated with the user's resource pool. In some embodiments, resource pool information, as used herein, refers to information associated with the user's resource pool managed by one or more resource entities. In some embodiments, the resource pool information comprises an interaction history (e.g., a transaction history, or the like) associated with the user's resource pool. The interaction history includes the types of interactions, frequency of interactions, resources used for the interactions, entities involved in the interactions, resource balance history, or the like. As used herein, an interaction, may be a transaction such as a purchase, a deposit, a withdrawal, a credit, a debit, or the like associated with a resource pool.

In some embodiments, the user information comprises other information as well. For example, in some embodiments, the user information comprises personal information (e.g., demographic information, salary information, contact information (mailing address, email address, phone number, or the like), residence address history, education information, job profile information, or the like) associated with the user. In some embodiments, the personal information further comprises social network information associated with the user's social network account or other non-account related information associated with the user. In some embodiments, the user information further comprises user information (e.g., personal information, account information, or the like) associated with the user's immediate or extended family members or contacts (e.g., as determined from social network information).

At block 230, the method comprises determining whether to allow a user access to supplemental resources based on the at least one rule and/or based on the received user information. It should be understood that the resource entity may have agreements with interaction entities to for providing supplemental resources to the user 4 if the user 4 enters into interactions with the interaction entities. The supplemental resources enable the user 4 to apply the supplemental resources to an interaction with an interaction entity in order to reduce the resources the user 4 uses from the user's resource pool to complete the interaction. As such, using the at least one rule and the received user information, the resource entity determines the targeted supplemental resources to present to the user 4. By using targeted supplemental resources, the resource entity can identify the users 4 most likely to use the supplemental resources in order to keep the users from leaving the resource entity applications 17 and keep the user's using the resources of the resource entity for the interactions with the interaction entities, and also reduces the storage capacity and processing capacity required to present the supplemental resources to the users 4 (e.g., because the supplemental resources are targeted to specific users 4).

At block 240 in FIG. 2, when a user 4 qualifies for supplemental resources the resource entity may provide a notification to a computing device of the user 4 regarding the supplemental resources. It should be understood that the user may receive a notification regarding the targeted supplemental resources from the resource entity. For example, the notification of the supplemental resources may be presented to the user 4 through the resource entity application 17 (e.g., user's online account accessed through the user computer systems 20), the social networking account of the user 4, electronic communication with the user 4 (e.g., user's e-mail, text message, SMS message, other messaging channel, or the like), or the like, as will be described in further detail later. However, in other embodiments, the resource entity application 17 may provide the notification to an application associated with the supplemental resource in some way, even if the application is not owned by the resource entity. For example, the resource entity application 17 may display a notification of a supplemental resource regarding a discount and/or rebate for Restaurant A on a third party's mapping or travel directions application that is stored and activated on a mobile device of the user 4 in response to the resource entity application 17 determining that the user 4 has input directions to (or near to) Restaurant A.

As illustrated by block 250, regardless of how the supplemental resources are presented, an indication of an action is received regarding the one or more supplement resources accepted by or for the user 4. The user 4 may take an action by accepting one or more of the supplemental resources presented to the user 4. In other embodiments of the invention, one or more of the plurality of supplemental resources may be added automatically base on the one or more supplemental resources determined for the use as previously discussed with respect to block 230 (e.g., all of the supplemental resources for the user 4 are automatically added, or the like).

At block 260 an indication is received that a user 4 has entered into an interaction with an interaction entity using the user's resources from the resource pool of the user 4 at the resource entity. The indication may include the product associated with the interaction, the amount of the interaction, and/or the resource pool used by the user 4 to enter into the interaction. Should the interaction be allowed (e.g., there are no interaction limits on the user preventing the interaction, the interaction entity is allowed, the user's resource pool can cover the balance, or the like) resources from the user's resource pool are allocated for the interaction.

At block 270, as will be described, in some embodiments, the supplemental resources may be applied at a point of time in the future when the interaction that qualifies for the supplemental resources is processed.

In some embodiments, when an interaction is processed by the resource entity at a time in the future (e.g., at settlement time or processing time after the interaction is entered), the system determines whether the supplemental resources are still active and whether the supplemental resources are still valid with respect to both the user 4 and the interaction entity interacting with the user 4. This post-transaction process may be referred to as a supplemental resource reconciliation process. The supplemental resources are still active if the supplemental resources have not been revoked by at least one of the resource entity or the interaction entity, and/or if the supplemental resources have not expired.

The supplemental resources are valid with respect to the interaction entity if the interaction entity is not excluded under any entity rules. In some embodiments, in order for the supplemental resources to be valid, the interaction entity cannot be excluded under any entity rules that were in force at the time of the interaction. Additionally or alternatively, in some embodiments, in order for the supplemental resources to remain valid, the interaction entity cannot be excluded under any entity rules that are in force at the time of settlement of the interaction. Therefore, in some embodiments, the interaction entity cannot be excluded under any new entity rules that have been introduced since the interaction.

The supplemental interactions are valid for the user 4 if the user 4 is not excluded under any user rules. In some embodiments, in order for the supplemental resources to be valid, the user 4 cannot be excluded under any user rules that were in force at the time of the interaction. Additionally or alternatively, in some embodiments, in order for the supplemental resources to remain valid, the user cannot be excluded under any user rules that are in force at the time of settlement of the interaction. Therefore, in some embodiments, the user cannot be excluded under any new user rules that have been introduced since the purchase transaction.

In still other embodiments of the invention, the supplemental resources may also meet specific interaction rules regarding the interaction of the user with the interaction entity. The interaction rules may be set by the interaction entity and/or the resource entity. For example, the interaction rules may require the user 4 to enter the interaction at a specific date, time of day, location, interaction channel (e.g., in person, over the Internet, over a telephone, or the like), for a specific amount of resources, or the like. Moreover, the interaction rules may require the user 4 to use resources from specific resource pools.

If the user rules, interaction entity rules, and/or the interaction rules are met at the time of the interaction and/or time of settlement, the supplemental resources are still valid and the resource entity applies the amount of supplemental resources to the user's resource pool and/or reduces the resources provided to the interaction entity by the amount of the supplemental resources. In some embodiments, if at least one of the user rules, interaction entity rules, and/or the interaction rules are not met at the time of the interaction and/or settlement, the supplemental resources are invalid and the resource entity does not apply the amount of supplemental resources to the user's resource pool and/or applies the full amount of resources to the interaction entity. In alternate embodiments, even if at least one of the user rules, interaction entity rules, and/or interaction rules are not met at the time of settlement, the supplemental resources remain valid as long as the all of the rules were met at the time of the interaction, and consequently the resource entity applies the supplemental resources to the user's resource pool and reduces the resources provided to the interaction entity by the amount of the supplemental resources.

In some embodiments, the supplemental resources (e.g., a notification of the access to the supplemental resources) are presented via at least one of a targeted integrated interface associated with the user's resource pool (e.g., online banking account, mobile banking account on a portable mobile communication device, or the like), via a targeted integrated interface associated with the user's social network account, or the like. In some embodiments, a notification of the supplemental resources are inserted into or presented alongside (e.g., on the right, left, top, bottom side of an electronic interfaces related to an interaction with an interaction entity) the interaction history that is presented on the user's online resource pool interactions (e.g., online interaction account).

Additionally or alternatively, in some embodiments, the supplemental resources are presented as icons, notifications, pop-up alerts, or are otherwise embedded within a third party application on a computing device of the user. For example, as illustrated and described in further detail with respect to FIG. 3, one or more supplemental resources may be displayed within or on top of a display in the third party application. A display 300 of a third party map navigation application is illustrated, including a destination icon 302 and a suggested route 304 along the roads or pathways to reach the destination. In this illustration, the resource entity application has identified that the destination 302 input into the third party map navigation application is an address for Merchant A. Additionally, the resource entity application has determined that there is a supplemental resource associated with Merchant A. Therefore, the resource entity application has caused a supplemental resource icon 306 for Merchant A to be displayed within the third party application display, on top of (or next to) the building representing Merchant A. Additionally, the third resource entity application has determined that a supplemental resource is associated with a nearby location of Merchant B. Therefore, the resource entity application has caused a supplemental resource icon 308 for Merchant B to display at Merchant B's location within the third party application.

The supplemental resource icons 306 and 308 may be selectable, whereby a selection of one of the supplemental resource icons 306 or 308 will transmit a notification to the resource entity application, informing the resource entity application that the user has selected the associated supplemental resource. As described herein, this indication that the user has selected a supplemental resource sets up the user to take advantage of the supplemental resource at a future point in time.

In other embodiments of the invention, the supplemental resources may be provided as an alert within the resource entity application 17 (e.g., online interaction account), which when selected may provide a targeted integrated interface with a plurality of supplemental resources for which the user 4 qualifies. In some embodiments, the notification for the supplemental resources is transmitted to the user's email account. In other embodiments, the notification for the supplemental resources is transmitted, via text message or the like, to the user's mobile device.

In some embodiments, the presented supplemental resources are related to at least one of an interaction previously entered by the user (e.g., a previous transaction associated with the user's financial institution account), an interaction from an interaction entity from which the user previously entered into an interaction, an alternative to the interaction previously entered into by the user, or an alternative to the interaction from the interaction entity from which the user previously entered into an interaction. The alternative to the interaction may be determined based on interaction histories associated with a plurality of resource pools associated with multiple users.

In some embodiments, the presented notification for the supplemental resources relates to a new product related to a previous product interaction made by the user. For example, if the user previously bought a stove, the supplemental resources may be related to a dishwasher or a stove maintenance service.

In some embodiments, a notification of supplemental resources sent to or presented on a resource pool associated with a first member of a family may be used by a second member of the family. In some embodiments, the second member of the family may use the supplemental resources even if the second member is not associated with the resource pool associated with the first member. For example, the supplemental resources associated with a particular interaction entity may be transmitted to (or linked to) a resource pool associated with a first family member. When the second member of the family enters an interaction that qualifies for the supplemental resources using the second member's resource pool (e.g., any qualifying payment method), the second member receives the allocation of the supplemental resources after entering into the interaction. The resource entity may have access to information that indicates that the second member is a family member of the first member even if the second member is not listed as being associated with the resource pool associated with the first member.

Additionally, in some embodiments, as part of the previously described supplemental resources reconciliation process at the time of settlement of the supplemental resources, the system determines whether the resource pool information substantially matches the supplemental resources information. If the resource pool information has changed since the interaction such that the resource pool information no longer substantially matches the supplemental resources information, the supplemental resources may be deemed to be invalid and the resource entity does not provide allocation of the supplemental resources to the user's resource pool. However, in other embodiments, even if the resource pool information has changed since the interaction, the offer remains valid and the financial institution provides a rebate to the user's financial institution account.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software. Multiple modules may be used to carry out one or more of the processes described herein. For example, a first module may be stored in non-volatile memory, such that it can be executed by a processor to cause the processor to perform actions like electronically receiving input information associated with a user, store the input information, queue received input information, and determine a user profile based on the received input information.

The input information may include various types of information associated with a user. For example, the input information may include account information associated with the user's financial institution account and personal information associated with the user or the user's financial institution account. In some embodiments, the input information may include information received from external systems (e.g., systems not managed by the financial institution that manages the user's financial institution account). For example, the input information may include social network information associated with the user's social network account. Therefore, each type of input information is queued on a single queue (or multiple queues) until enough input information is received to classify the user based on one or more predetermined user profiles as described below. The invention is not limited to any duration of time that the input information spends on a queue.

Some embodiments of the processes described herein involve receiving first input information associated with a user, the first input information being associated with the user's financial institution account and being received from a first system. This first input information can then be queued until second input information associated with the user is received, the second input information comprising personal information associated with the user and being received from a second system. Furthermore, the system may then classify the user according to a user profile based on the first input information and the second input information.

In other alternate embodiments, the first input information comprises personal information associated with the user that is received from the second system. This first input information is queued until second input information associated with the user's financial institution account is received from the first system.

In some embodiments, the first input information comprises information associated with single-holder accounts (no joint holders) associated with the user, and the second input information comprises information associated with joint accounts associated with the user.

In some embodiments, the first input information comprises a transaction history associated with the user's financial institution account. In some embodiments as described herein, the transaction history may be associated with a predetermined time period (e.g., the previous three months). The transaction history includes the types of transactions, frequency of transactions, an amount of each transaction, merchants associated with transactions, account balance history, or the like. Additionally or alternatively, the account information may or may not comprise information associated with incorrect, inconsistent, incomplete, or corrupted transactions. As used herein, a transaction may comprise a purchase, a deposit, a withdrawal, a credit, a debit, or the like.

In some embodiments, the second input information (e.g., personal information) comprises demographic information, salary information, contact information (mailing address, email address, phone number, or the like), residence address history, social network information, education information, job profile information, or the like. In some embodiments, the second input information may also comprise personal information or account information associated with the user's immediate or extended family members or contacts (e.g., as determined from social network information).

In some embodiments, the user profile comprises a collection of users that are associated with similar characteristics. These characteristics may relate to the users' account transactional behavior (e.g., types of transactions, frequency of transactions, amount of each transaction, merchants associated with transactions, account balance history, or the like). As used herein, a transaction may comprise a purchase, a deposit, a withdrawal, a credit, a debit, or the like. Additionally or alternatively, these characteristics may relate to the users' personal characteristics (e.g., demographic information, salary information, location information, social network information, education information, job profile information, or the like).

In some embodiments, the queue comprising the first input information is reorganized into a cached area of the system. Additionally or alternatively, the queue comprising the second input information is reorganized into a cached area of the system. This reorganization process improves the processing speed of any process that uses at least one of the first input information or the second input information.

In storing the first input information and the second input information in the queue, the system may associate the queue with the volatile memory of the system (e.g., computing device system or network).

Additionally, a second module may be provided, where the second module is stored in the non-volatile memory and is executable by at least one processor to cause the at least one processor to perform certain actions. For example, the second module may cause the at least one processor to perform the actions and steps described with respect to FIG. 4.

Referring now to FIG. 4, a flowchart is provided to illustrate one embodiment of a process 400 for transmitting data between networked resources, in accordance with embodiments of the invention. As used herein, the term "offer" refers to discounts, rebates, or the like for a product or service that can be purchased by a user, where the discount or rebate is applied at point in time later than the transaction that purchases the product of service. The term "offer" may also be referred to as a "supplemental resource," where a resource may refer to money, a line of credit, or the like. In such cases, the supplemental resource is supplementing the resources by providing a rebate, coupon, discount, or the like that reduces the amount of resources needed to pay for the product or service. Similarly, the use of the term "purchase" may also refer to as an interaction with a merchant.

In some embodiments, the process 400 may include block 402, where the system provides a resource entity application to a user for installation on a mobile device of the user. The resource entity application may be associated with a resource entity (e.g., a managing entity, a financial institution, or the like). For example, the resource entity application may be a mobile financial institution application associated with a financial institution. This mobile financial institution application may provide certain products and services to the user including, but not limited to, displaying account balances, providing services associated with accounts of the user, providing suggestions on how to manage or use the accounts of the user, provide offers (e.g., supplemental resources) for third party products or services to the user, and the like.

Certain instructions may be provided to the resource entity application over time to instruct the resource entity application to perform certain tasks, acquire data, transfer data, monitor one or more third party applications on the same mobile device or on a separate computing device in network communication with the user's mobile device, cause third party applications, and the like. One or more of the following steps described with respect to the process 400 may performed by the resource entity application in direct response to receiving instructions from a managing entity system.

In some embodiments, the process 400 includes block 404, where the system determines offer information associated with an offer based on a user profile, where the offer enables the user to receive a discount or rebate on a purchase from a merchant associated with the resource entity. As described above, the user profile comprises information (sometimes queued) regarding the user, the financial accounts of the user, the user's transaction history, the user's preferences, user-provided input, user location data, and the like. The user profile may be generated or determined based on this user information, such that the user is categorized, or placed into one or more user profile groups. For example, if the user has made a purchase for a round at a golf course, the user profile may be updated to be associated with golf, sports, or the like. In this way, the system can identify targeted offers to provide to the user that fit, match, or otherwise correlate with the user profile of the user.

The entity managing at least a portion of the process 400 (e.g., a managing entity) may have a database of currently available and/or future offers for products and services of one or more third party entities (e.g., merchants). For example, the managing entity may have negotiated with third party entities to obtain offers (or other supplemental resources) to provide to individuals associated with the managing entity's offer program. In requesting or negotiating the offers to be made available, the managing entity may request information associated with the offer. For example, the third party entity may provide information about the industry of the offer, the type of offer, the type of merchant that the third party entity is, one or more locations associated with the offer, a timeline associated with the offer, an age demographic that the third party entity would like to target, and any other information that could be matched up with a user profile to target offers to one or more users. Additionally or alternatively, the managing entity may input this offer information on its own.

Additionally, in some embodiments, the process 400 includes block 406, where the system establishes a communication link with the mobile device of the user. This communication link may have been established prior to providing the resource entity application, whereby the resource entity application is then sent to the mobile device of the user via this communication link. In some embodiments, this communication link with the mobile device of the user is a dedicated, secure, encrypted, and/or otherwise protected communication channel. In this way, data transmitted to or from the mobile device is protected, which is especially important when transmitting information associated with a user's personal information, financial account information, transaction history, and the like.

The process 400 may also include block 408, where the system transmits, via the communication link, the offer to the mobile device of the user for storage in association with the resource entity application. Of course, the managing entity may transmit multiple offers to the mobile device of the user, along with instructions for the resource entity application to store the offers in a database. In some embodiments, the actual offers are stored on a remote server, but the resource entity application still stores information about the offer, a link to the offer, or some other information that enables the resource entity application to identify, access, use, or otherwise retrieve the offer as long as the mobile device of the user is in network communication with the database storing the offer.

The resource entity application may then perform one or more steps to identify the offer, extract information associated with the offer, and the like. As such, in some embodiments, the process 400 includes block 410, where the system determines that the offer is associated with a third party application. This determination may be that the offer is provided by a first third party entity, and an application also owned or controlled by that first third party entity is also stored on the mobile device of the user. Alternatively, the determination may be that the offer is provided by the first third party entity, and an application owned by a second third party entity is stored on the mobile device of the user, where this application provides a product or service that can be used in conjunction with the offer. For example, a mapping application may be able to display information about an address associated with an offer for a discount at a restaurant, even though the entity that owns the mapping application and the restaurant owner are not the same entity.

Another example of how an offer and a third party application can be determined to be related or otherwise associated with each other is a third party shopping application that provides links to several products or services, where one of the products or services is the subject of the offer.

In another example, a third party application may be a navigation or rideshare application where the user is able to input a desired location and the third party application displays a map with directions or instructions on how to get from the user's current location to the desired location. This type of third party application can be determined to be associated with any offer that has location information along the suggested navigation path, at some point in the map displayed on the screen, and the like.

Of course, other types of third party applications may be associated with the offer in some way, including, but not limited to, gaming applications, virtual reality applications, augmented reality applications, social media applications, food services applications, and the like. There may be some information about these applications that matches or is in some way related to the offer, and therefore the offer and those applications are paired. In some embodiments, the managing entity or the resource entity simply provide a list of third party applications that are associated with the offer.

In some embodiments, the resource entity or the managing entity (if different entities) may be required to prove that they have permission to associate the offer to one or more of the third party applications. For example, an owner of a mapping application may not be willing to have the resource entity application provide notifications, provide pop-ups, embed notifications, or the like within the mapping application without the owner's permission. Therefore, the resource entity application may request permission to associate the offer and the third party application before actually linking the two. In some cases, the third party application has provided a pre-approval for the resource entity application to associate one or more offers with that third party application. These permissions may be stored in a database (either on the mobile device or in a remote database) for future reference, if needed.

Additionally, in some embodiments, the process 400 includes block 412, where the system causes the third party application to display a selectable notification of the offer within the third party application in response to determining that the third party application has been activated and is in use. The term "in use," as used herein, refers to a computing device application that has already been activated, is running in an active state, and is able to be used by the user. In some embodiments, the application must also be displaying some information on the mobile device of the user, however this is not required in every embodiment.

Additional requirements may also need to be met before the system will actually cause the third party application to display the offer. For example, if an offer is heavily associated with a specific offer or merchant location, the system may monitor the location of the mobile device of the user (e.g., monitor global positioning system (GPS) information, identify locations of Internet networks (e.g., Wi-Fi) that the user is accessing, and the like). Once the system determines that the mobile device is within a predetermined distance of the offer or merchant location, then the system may be prepared to carry out the rest of block 412 and provide the offer to the user via the third party application. In this way, the system can further target the users that will receive the offers to those users that are near a location that the offer is dependent on (i.e., for offers that are more likely to be used if the user is near or at a specific location).

Similarly, the system may require the user to provide authentication credentials (e.g., a username, a password, biometric information, an answer to a security question, and the like) before displaying the selectable notification of the offer within the third party application. Once the user provides accurate authentication credentials, the system will authorize the user to access or otherwise select the offer. In some embodiments, to accomplish this step, the system may cause the mobile device of the user to activate the resource entity application, and instruct the resource entity application to request these authentication credentials, compare the received authentication credentials to known or stored credentials, and make the determination as to whether the person accessing the mobile device of the user has the authority to receive, access, or use the offer.

To determine that the third party application is activated and in use, the resource entity application may monitor the third party application (perhaps along with other applications on the mobile device) for activation information, log information, information input into the third party application, and the like.

Once the system determines that the offer can be transmitted to the third party application, the system can cause the third party application to display the offer in several different ways. A first example of how the system can cause the third party application to display the offer is to instruct the third party application to display a pop-up notification that overlays at least a portion of the display of the third party application. This pop-up notification may be triggered by the user opening the third party application, by the user navigating to a specific location within the application (e.g., the user opens a list of products being sold via the third party application, and that list includes a product associated with the offer), a location of the mobile device (e.g., the user is within a predetermined distance of the merchant associated with the offer), and the like.

A second example of how the system can cause the third party application to display the offer is to display a notification embedded within the third party application. For example, in a third part application that displays mapped representations of the user's surroundings or geographical navigation path, a location-based offer notification can be displayed at or near the representation of that location on the map. As mentioned above, FIG. 3 provides one sample display 300 of this embedded location-based offer notification (e.g., supplemental resource icon 306 or supplemental resource icon 308). In such embodiments, the embedded offer notification may move with respect to the map, as the geographical scope or area represented in the map application changes or moves.

A third example of how the system can cause the third party application to display the offer is to cause the third party application to display the offer notification on an "offer page" or some location within the application that is dedicated to offers.

These displayed offer notifications may provide information regarding the offer, and possibly information about how it relates to the third party application (e.g., "the product associated with the offer is available for sale in this third party application," "the merchant associated with this offer is on the suggested route to your desired destination," "your desired destination is a location at least near to the merchant location associated with this offer," and the like).

The displayed offer notifications are selectable, in that the user can tap a touch-screen display of the mobile device, or otherwise select the offer in the environment of the third party application as a signal that the user accepts or wishes to use the offer. This selection is then transferred from the third party application (sometimes by the third party application) to the resource entity application or the managing entity system as an indication that the user selected the offer.

The process 400 may include block 414, where the system receives an indication from the third party application that the user has selected the selectable notification of the offer. As mentioned above, the third party application may transmit the indication that the user selected the selectable offer notification back to the resource entity application and/or the managing entity system. The managing entity system can then consider the offer as having been selected and approve any necessary permissions for allowing the user to make use of the offer at some later point in time. In some embodiments, the offer is available for a certain amount of time (either in general or with respect to the date and time that the offer was selected by the user). Therefore, the system may monitor the timeline of the offer and provide notices to the user when the offer is about to expire.

Furthermore, the process 400 may include block 416, where the system determines that the user has executed the purchase with the merchant. To determine that the user has executed the purchase associated with the offer, the system may monitor the transactions of the user, review the transaction history of the user, and the like. As the offer is only put into use once (or after) the purchase or transaction associated with the offer has taken place, the system may pay special attention to transactions that are likely to be associated with the offers that have been selected by the user.

Finally, the process 400 may continue to block 418, where the system applies the at least one offer to the purchase with the merchant at a later date. In some embodiments, the offers are not applied directly to the transaction as the user purchases the item. Instead, the user purchases the product or service associated with the offer at its listed price, and the managing entity system applies the rebate, discount, or other reward to the user's transaction at a later point in time (e.g., while the transaction associated with the offer is in a processing status with a financial institution, as the offer transition is processed, and the like). Therefore, the discount or rebate of the offer is applied at some point in time after the actual transaction associated with the offer.

Referring generally to the embodiments of the invention, supplement resources may be offers for discounts, rebates, and/or coupons (e.g., reverse couponing) that are applied to the user's resource pool retroactively after the interaction has been made. As such, the system enables transmission of individualized or personalized offers to users. For example, an offer associated with a merchant may be a 10% discount on a purchase made from that merchant. As an example, the activated offer may be a rebate of $5 on a purchase of $20 from a department store. The user may decide to use the offer by visiting the department store and making a purchase of $20. In some embodiments, at the point of sale, the user pays $20 for the user's purchase using an eligible payment method determined by the financial institution or the merchant (e.g., payment card, mobile device payment, check, or the like). When the transaction is processed by the financial institution at a predetermined settlement time in the future (e.g., as part of a periodic batch processing operation to generate monthly account statements), the financial institution provides a rebate of $5 to the user's financial institution account. Therefore, the department store, at the point of sale, may have no knowledge that the user will receive a rebate at some point in the future. In some embodiments, even the user may not be aware of the rebate at the point of sale (e.g., if the offer was automatically activated). In other embodiments, the point of sale terminal may provide an indication to at least one of the department store or the user that the user will receive a rebate at some point in the future.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The volatile memory and the non-volatile memory may be independent of each other. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/630,381 now published as 2018/0373569 | SYSTEM FOR LINKING ALTERNATE RESOURCES TO RESOURCE POOLS AND ALLOCATING LINKED ALTERNATIVE RESOURCES TO A RESOURCE INTERACTION | Concurrently herewith |
| 15/630,270 now published as 2018/0376378 | DYNAMIC UTILIZATION OF ALTERNATIVE RESOURCES BASED ON TOKEN ASSOCIATION | Concurrently herewith |
| 15/630,284 | PROACTIVE RESOURCE | Concurrently |

-continued

| U.S. patent application Ser. No. | Title | Filed On |
|---|---|---|
| now published as 2018/0375794 | ACQUISITION BASED ON ANTICIPATED NEED | herewith |
| 15/630,289 now published as 2018/0375959 | DATA TRANSMISSION TO A NETWORKED RESOURCE BASED ON CONTEXTUAL INFORMATION | Concurrently herewith |

The invention claimed is:

1. A system for transmitting data between networked resources, the system comprising:
 at least one memory comprising a volatile memory and a non-volatile memory, wherein the volatile memory and the non-volatile memory are independent of each other;
 at least one processor;
 a first module stored in the non-volatile memory, executed by the at least one processor, and configured to cause the at least one processor to:
  electronically receive input information associated with a user, wherein the input information comprises user information associated with the user, the user information comprising account information associated with the user and personal information associated with the user;
  determine a user profile based on at least the input information;
 a second module stored in the non-volatile memory, executable by the at least one processor, and configured to cause the at least one processor to:
  provide a resource entity application to a user for installation on a mobile device of the user, wherein the resource entity application is associated with a resource entity;
  determine supplemental resource information associated with a supplemental resource based on at least the user profile, wherein the supplemental resource is associated with a merchant that has a relationship with the resource entity;
  establish, using a computing device processor, a communication link with a mobile device of the user, wherein establishing further comprises creating a wireless data channel with the mobile device of the user;
  transmit, via the established communication link, the supplemental resource to the mobile device of the user for storage in association with the resource entity application;
  determine that the supplemental resource is associated with a third party application, wherein the third party application is stored on the mobile device of the user or a separate computing device of the user that is in network communication with the mobile device of the user;
  determine that the third party application has been activated and is in use;
  in response to determining that the third party application has been activated and is in use, cause the third party application to display a selectable notification of the supplemental resource within the third party application;
  receive an indication from the third party application that the user has selected the selectable notification of the supplemental resource;
  determine that the user has an interaction with the merchant at a merchant interaction date; and
  apply the supplemental resource to the interaction with the merchant at a future settlement date that is after the merchant interaction date.

2. The system of claim 1, wherein electronically receiving the input information associated with the user further comprises electronically receiving a first input information associated with a user, wherein the first input information comprises user information associated with a user logged into an online banking website, the user information comprising account information associated with the a financial institution account of the user and personal information associated with the user.

3. The system of claim 2, wherein the first module, when executed by the at least one processor, is further configured to cause the at least one processor to:
 store the first input information in a queue associated with the volatile memory until a second input information is received, wherein queuing further comprises reorganizing the first input information into the volatile memory;
 receive second input information associated with the user, wherein the second input information comprises social network information associated with the user;
 store the second input information in the queue associated with the volatile memory, wherein queuing the second input information further comprises reorganizing the second input information into the volatile memory; and
 determine the user profile based on at least the first input information and the second input information stored in the queue associated with the volatile memory.

4. The system of claim 1, wherein the supplemental resource comprises an offer, wherein the offer enables the user to receive at least one of a discount or a rebate on a purchase from the merchant that has the relationship with the resource entity.

5. The system of claim 1, wherein the interaction with the merchant is a purchase.

6. The system of claim 1, wherein the third party application is one of a map application, a navigation application, a ride-share application, a shopping application, a mobile game application, an augmented reality application, a virtual reality application, a social media application, or a food services application.

7. The system of claim 1, wherein the second module, when executed by the at least one processor, is further configured to cause the at least one processor to:
 request authentication credentials of the user;
 receive the authentication credentials from the mobile device of the user; and
 authenticate the user to access the supplemental resource within the third party application.

8. The system of claim 1, wherein the second module, when executed by the at least one processor, is further configured to cause the at least one processor to:
 monitor a location of the mobile device of the user;
 determine that the location of the mobile device of the user is within a predetermined distance from a location associated with the supplemental resource; and
 in response to determining that the location of the mobile device of the user is within the predetermined distance from the location associated with the supplemental resource, cause the third party application to display the selectable notification of the supplemental resource within the third party application.

9. A computer program product for transmitting data between networked resources, the computer program product comprising at least one non-transitory computer readable medium comprising computer readable instructions, the instructions comprising instructions for:

electronically receiving input information associated with a user, wherein the input information comprises user information associated with the user, the user information comprising account information associated with the user and personal information associated with the user;

determining a user profile based on at least the input information;

providing a resource entity application to a user for installation on a mobile device of the user, wherein the resource entity application is associated with a resource entity;

determining supplemental resource information associated with a supplemental resource based on at least the user profile, wherein the supplemental resource is associated with a merchant that has a relationship with the resource entity;

establishing, using a computing device processor, a communication link with a mobile device of the user, wherein establishing further comprises creating a wireless data channel with the mobile device of the user;

transmitting, via the established communication link, the supplemental resource to the mobile device of the user for storage in association with the resource entity application;

determining that the supplemental resource is associated with a third party application, wherein the third party application is stored on the mobile device of the user or a separate computing device of the user that is in network communication with the mobile device of the user;

determining that the third party application has been activated and is in use;

in response to determining that the third party application has been activated and is in use, causing the third party application to display a selectable notification of the supplemental resource within the third party application;

receiving an indication from the third party application that the user has selected the selectable notification of the supplemental resource;

determining that the user has an interaction with the merchant at a merchant interaction date; and applying the supplemental resource to the interaction with the merchant at a future settlement date that is after the merchant interaction date.

10. The computer program product of claim 9, wherein electronically receiving the input information associated with the user further comprises electronically receiving a first input information associated with a user, wherein the first input information comprises user information associated with a user logged into an online banking website, the user information comprising account information associated with a financial institution account of the user and personal information associated with the user.

11. The computer program product of claim 10, wherein the computer readable instructions further comprise instructions for:

storing the first input information in a queue associated with the volatile memory until a second input information is received, wherein queuing further comprises reorganizing the first input information into the volatile memory;

receiving second input information associated with the user, wherein the second input information comprises social network information associated with the user;

storing the second input information in the queue associated with the volatile memory, wherein queuing the second input information further comprises reorganizing the second input information into the volatile memory; and determining the user profile based on at least the first input information and the second input information stored in the queue associated with the volatile memory.

12. The computer program product of claim 9, wherein the supplemental resource comprises an offer, wherein the offer enables the user to receive at least one of a discount or a rebate on a purchase from the merchant that has the relationship with the resource entity.

13. The computer program product of claim 9, wherein the third party application is one of a map application, a navigation application, a ride-share application, a shopping application, a mobile game application, an augmented reality application, a virtual reality application, a social media application, or a food services application.

14. The computer program product of claim 9, wherein the computer readable instructions further comprise instructions for:

requesting authentication credentials of the user;

receiving the authentication credentials from the mobile device of the user; and authenticating the user to access the supplemental resource within the third party application.

15. The computer program product of claim 9, wherein the computer readable instructions further comprise instructions for:

monitor a location of the mobile device of the user;

determine that the location of the mobile device of the user is within a predetermined distance from a location associated with the supplemental resource; and in response to determining that the location of the mobile device of the user is within the predetermined distance from the location associated with the supplemental resource, cause the third party application to display the selectable notification of the supplemental resource within the third party application.

16. A computer implemented method for transmitting data between networked resources, said computer implemented method comprising:

electronically receiving input information associated with a user, wherein the input information comprises user information associated with the user, the user information comprising account information associated with the user and personal information associated with the user;

determining a user profile based on at least the input information;

providing a resource entity application to a user for installation on a mobile device of the user, wherein the resource entity application is associated with a resource entity;

determining supplemental resource information associated with a supplemental resource based on at least the user profile, wherein the supplemental resource is associated with a merchant that has a relationship with the resource entity;

establishing, using a computing device processor, a communication link with a mobile device of the user, wherein establishing further comprises creating a wireless data channel with the mobile device of the user;

transmitting, via the established communication link, the supplemental resource to the mobile device of the user for storage in association with the resource entity application;

determining that the supplemental resource is associated with a third party application, wherein the third party application is stored on the mobile device of the user or a separate computing device of the user that is in network communication with the mobile device of the user;

determining that the third party application has been activated and is in use;

in response to determining that the third party application has been activated and is in use, causing the third party application to display a selectable notification of the supplemental resource within the third party application;

receiving an indication from the third party application that the user has selected the selectable notification of the supplemental resource;

determining that the user has an interaction with the merchant at a merchant interaction date; and applying the supplemental resource to the interaction with the merchant at a future settlement date that is after the merchant interaction date.

17. The computer implemented method of claim 16, wherein electronically receiving the input information associated with the user further comprises electronically receiving a first input information associated with a user, wherein the first input information comprises user information associated with a user logged into an online banking website, the user information comprising account information associated with a financial institution account of the user and personal information associated with the user.

18. The computer implemented method of claim 17, further comprising:

storing the first input information in a queue associated with the volatile memory until a second input information is received, wherein queuing further comprises reorganizing the first input information into the volatile memory;

receiving second input information associated with the user, wherein the second input information comprises social network information associated with the user;

storing the second input information in the queue associated with the volatile memory, wherein queuing the second input information further comprises reorganizing the second input information into the volatile memory; and determining the user profile based on at least the first input information and the second input information stored in the queue associated with the volatile memory.

19. The computer implemented method of claim 16, wherein the supplemental resource comprises an offer, wherein the offer enables the user to receive at least one of a discount or a rebate on a purchase from the merchant that has the relationship with the resource entity.

20. The computer implemented method of claim 16, further comprising:

monitoring a location of the mobile device of the user;

determining that the location of the mobile device of the user is within a predetermined distance from a location associated with the supplemental resource; and in response to determining that the location of the mobile device of the user is within the predetermined distance from the location associated with the supplemental resource, causing the third party application to display the selectable notification of the supplemental resource within the third party application.

* * * * *